(12) United States Patent
Lira

(10) Patent No.: US 10,365,785 B2
(45) Date of Patent: Jul. 30, 2019

(54) CONSTRAINING DISPLAY MOTION IN DISPLAY NAVIGATION

(71) Applicant: Facebook, Inc., Menlo Park, CA (US)

(72) Inventor: Luigi Lira, Costa Mesa, CA (US)

(73) Assignee: FACEBOOK, INC., Menlo Park, CA (US)

( * ) Notice: Subject to any disclaimer, the term of this patent is extended or adjusted under 35 U.S.C. 154(b) by 948 days.

(21) Appl. No.: 14/176,585

(22) Filed: Feb. 10, 2014

(65) Prior Publication Data

US 2014/0317557 A1    Oct. 23, 2014

Related U.S. Application Data

(63) Continuation of application No. 13/730,707, filed on Dec. 28, 2012, now Pat. No. 8,648,801, which is a continuation of application No. 13/683,828, filed on Nov. 21, 2012, now abandoned, which is a continuation of application No. 12/963,444, filed on
(Continued)

(51) Int. Cl.
| | | |
|---|---|---|
| *G06F 3/0481* | (2013.01) | |
| *G06F 16/957* | (2019.01) | |
| *G06F 3/0485* | (2013.01) | |
| *G06F 3/0488* | (2013.01) | |
| *G06F 17/21* | (2006.01) | |

(Continued)

(52) U.S. Cl.
CPC .......... *G06F 3/04817* (2013.01); *G06F 3/041* (2013.01); *G06F 3/0412* (2013.01); *G06F 3/0485* (2013.01); *G06F 3/0488* (2013.01); *G06F 3/04883* (2013.01); *G06F 16/9577* (2019.01); *G06F 17/211* (2013.01); *G09G 1/00* (2013.01)

(58) Field of Classification Search
CPC .. G06F 17/211; G06F 17/30905; G06F 3/041; G06F 3/0412; G06F 3/04817; G06F 3/0485; G06F 3/0488; G06F 3/04883; G09G 1/00
See application file for complete search history.

(56) References Cited

U.S. PATENT DOCUMENTS

| | | |
|---|---|---|
| 3,307,177 A | 2/1967 | Novak |
| 4,550,221 A | 10/1985 | Mabusth |

(Continued)

FOREIGN PATENT DOCUMENTS

| | | |
|---|---|---|
| CN | 1754141 | 3/2006 |
| DE | 102008052485 | 4/2010 |

(Continued)

OTHER PUBLICATIONS

U.S. Appl. No. 13/731,364, dated Feb. 28, 2014, Office Action.
(Continued)

*Primary Examiner* — Kenneth Bukowski
(74) *Attorney, Agent, or Firm* — Keller Jolley Preece

(57) ABSTRACT

Navigating on a display includes tracking motion of an input tool on a display, comparing a motion of the input tool to a threshold, and changing a position of the visible portion of a page of information on the display if the input tool motion exceeds the threshold. The position of the visible portion of the page of information on the display is constrained if the motion does not exceed the threshold.

20 Claims, 25 Drawing Sheets

Related U.S. Application Data

Dec. 8, 2010, now Pat. No. 9,678,621, which is a continuation of application No. 11/617,997, filed on Dec. 29, 2006, now Pat. No. 7,872,640, which is a continuation of application No. 10/307,403, filed on Dec. 2, 2002, now Pat. No. 7,193,609.

(60) Provisional application No. 60/368,988, filed on Apr. 2, 2002, provisional application No. 60/365,160, filed on Mar. 19, 2002, provisional application No. 60/365,161, filed on Mar. 19, 2002, provisional application No. 60/365,197, filed on Mar. 19, 2002.

(51) Int. Cl.
*G09G 1/00* (2006.01)
*G06F 3/041* (2006.01)

(56) References Cited

U.S. PATENT DOCUMENTS

| | | |
|---|---|---|
| 4,618,989 A | 10/1986 | Tsukune et al. |
| 4,746,770 A | 5/1988 | McAvinney |
| 4,843,568 A | 6/1989 | Krueger et al. |
| 4,899,292 A | 2/1990 | Montagna et al. |
| 4,954,967 A | 9/1990 | Hiroshi |
| 5,005,119 A | 4/1991 | Rumbaugh et al. |
| 5,038,138 A | 8/1991 | Akiyama et al. |
| 5,241,674 A | 8/1993 | Kurosawa et al. |
| 5,260,697 A | 11/1993 | Barrett et al. |
| 5,317,306 A | 5/1994 | Abraham et al. |
| 5,365,461 A | 11/1994 | Stein et al. |
| 5,371,846 A | 12/1994 | Bates |
| 5,374,787 A | 12/1994 | Miller et al. |
| 5,406,307 A | 4/1995 | Hirayama et al. |
| 5,428,367 A | 6/1995 | Mikan |
| 5,463,725 A | 10/1995 | Henckel et al. |
| 5,483,261 A | 1/1996 | Yasutake |
| 5,488,204 A | 1/1996 | Mead et al. |
| 5,504,917 A | 4/1996 | Austin |
| 5,534,893 A | 7/1996 | Hansen et al. |
| 5,543,591 A | 8/1996 | Gillespie et al. |
| 5,590,257 A | 12/1996 | Forcier |
| 5,615,384 A | 3/1997 | Allard et al. |
| 5,663,997 A | 5/1997 | Barber |
| 5,636,297 A | 6/1997 | Eller et al. |
| 5,638,092 A | 6/1997 | Eng et al. |
| 5,638,523 A | 6/1997 | Mullet et al. |
| 5,657,434 A | 8/1997 | Yamamoto et al. |
| 5,694,150 A | 12/1997 | Sigona et al. |
| 5,724,985 A | 3/1998 | Snell et al. |
| 5,734,751 A | 3/1998 | Saito |
| 5,740,389 A | 4/1998 | Li et al. |
| 5,748,926 A | 5/1998 | Fukuda et al. |
| 5,798,752 A | 8/1998 | Buxton |
| 5,825,352 A | 10/1998 | Bisset et al. |
| 5,835,079 A | 11/1998 | Sheih |
| 5,844,561 A | 12/1998 | Tanimoto et al. |
| 5,845,303 A | 12/1998 | Templeman |
| 5,869,791 A | 2/1999 | Young |
| 5,877,757 A | 3/1999 | Baldwin et al. |
| 5,880,411 A | 3/1999 | Gillespie et al. |
| 5,880,722 A * | 3/1999 | Brewer .............. G06F 3/04847 715/723 |
| 5,886,697 A | 3/1999 | Naughton et al. |
| 5,897,602 A | 4/1999 | Mizuta |
| 5,903,902 A | 5/1999 | Orr et al. |
| 5,907,327 A | 5/1999 | Ogura et al. |
| 5,942,733 A | 8/1999 | Allen et al. |
| 5,949,432 A | 9/1999 | Gough et al. |
| 5,956,020 A | 9/1999 | D'Amico |
| 5,961,590 A | 10/1999 | Mendez et al. |
| 5,978,804 A | 11/1999 | Dietzman |
| 6,008,799 A | 12/1999 | Van Kleeck |
| 6,023,714 A | 2/2000 | Hill et al. |
| 6,028,271 A | 2/2000 | Weidenfeller et al. |
| 6,028,602 A | 2/2000 | Wagner et al. |
| 6,037,937 A | 3/2000 | Beaton et al. |
| 6,061,063 A | 5/2000 | Wagner et al. |
| 6,067,068 A | 5/2000 | Hussain |
| 6,141,018 A | 10/2000 | Beri et al. |
| 6,161,114 A | 12/2000 | King et al. |
| 6,182,142 B1 | 1/2001 | Win et al. |
| 6,188,391 B1 | 2/2001 | Seely et al. |
| 6,211,877 B1 | 4/2001 | Steele et al. |
| 6,212,550 B1 | 4/2001 | Segur |
| 6,212,577 B1 | 4/2001 | Stern et al. |
| 6,233,351 B1 | 5/2001 | Feeney et al. |
| 6,239,389 B1 | 5/2001 | Allen et al. |
| 6,239,797 B1 | 5/2001 | Hills et al. |
| 6,259,449 B1 | 7/2001 | Saxena et al. |
| 6,262,732 B1 | 7/2001 | Coleman et al. |
| 6,278,443 B1 | 8/2001 | Amro et al. |
| 6,288,704 B1 | 9/2001 | Flack et al. |
| 6,300,947 B1 | 10/2001 | Kanevsky |
| 6,300,967 B1 | 10/2001 | Wagner et al. |
| 6,320,610 B1 | 10/2001 | Beaton et al. |
| 6,323,803 B1 | 11/2001 | Jolley et al. |
| 6,323,878 B1 | 11/2001 | Haffey et al. |
| 6,326,970 B1 | 12/2001 | Mott et al. |
| 6,337,697 B1 | 1/2002 | Kim |
| 6,337,698 B1 | 1/2002 | Westerman et al. |
| 6,340,979 B1 | 1/2002 | Beaton et al. |
| 6,351,777 B1 | 2/2002 | Simonoff |
| 6,374,273 B1 | 4/2002 | Webster |
| 6,389,437 B2 | 5/2002 | Stoub |
| 6,396,487 B1 | 5/2002 | Jameson |
| 6,405,132 B1 | 6/2002 | Breed et al. |
| 6,407,757 B1 | 6/2002 | Ho |
| 6,456,305 B1 | 9/2002 | Qureshi et al. |
| 6,456,307 B1 | 9/2002 | Bates et al. |
| 6,457,030 B1 | 9/2002 | Adams et al. |
| 6,446,199 B1 | 10/2002 | Takase et al. |
| 6,463,460 B1 | 10/2002 | Simonoff |
| 6,486,896 B1 | 11/2002 | Ubillos |
| 6,493,002 B1 | 12/2002 | Christensen |
| 6,509,907 B1 | 1/2003 | Kuwabara |
| 6,526,399 B1 | 2/2003 | Coulson et al. |
| 6,545,669 B1 * | 4/2003 | Kinawi .............. G06F 3/0486 345/1.1 |
| 6,570,557 B1 | 5/2003 | Westerman et al. |
| 6,570,594 B1 | 5/2003 | Wagner |
| 6,590,594 B2 | 7/2003 | Bates et al. |
| 6,593,944 B1 | 7/2003 | Nicolas et al. |
| 6,597,378 B1 | 7/2003 | Shiraishi et al. |
| 6,624,831 B1 | 9/2003 | Shahine et al. |
| 6,675,351 B1 | 1/2004 | Leduc |
| 6,677,932 B1 | 1/2004 | Westerman |
| 6,690,387 B2 | 2/2004 | Zimmerman et al. |
| 6,694,487 B1 | 2/2004 | Ilsar |
| 6,707,449 B2 | 3/2004 | Hinckley et al. |
| 6,724,618 B1 | 4/2004 | Jenkins et al. |
| 6,727,894 B1 | 4/2004 | Karidis et al. |
| 6,728,675 B1 | 4/2004 | Maddalozzo et al. |
| 6,741,268 B1 | 5/2004 | Harakawa |
| 6,741,966 B2 | 5/2004 | Brechner et al. |
| 6,763,341 B2 | 7/2004 | Okude |
| 6,771,068 B2 | 8/2004 | Dale et al. |
| 6,771,290 B1 | 8/2004 | Hoyle |
| 6,788,293 B1 | 9/2004 | Silverbrook et al. |
| 6,791,529 B2 | 9/2004 | Shteyn |
| 6,791,530 B2 | 9/2004 | Vernier et al. |
| 6,816,626 B1 | 11/2004 | Fadel |
| 6,820,237 B1 | 11/2004 | Abu-Hakima et al. |
| 6,839,721 B2 | 1/2005 | Schwols |
| 6,842,674 B2 | 1/2005 | Solomon |
| 6,857,102 B1 | 2/2005 | Bickmore et al. |
| 6,883,000 B1 | 4/2005 | Gropper |
| 6,903,927 B2 | 6/2005 | Anlauff |
| 6,907,580 B2 | 6/2005 | Michelman et al. |
| 6,920,619 B1 | 7/2005 | Milekic |
| 6,928,604 B2 | 8/2005 | Park et al. |
| 6,957,392 B2 | 10/2005 | Simister et al. |
| 6,958,749 B1 | 10/2005 | Matushita et al. |

(56) References Cited

U.S. PATENT DOCUMENTS

| | | |
|---|---|---|
| 6,970,160 B2 | 11/2005 | Mulligan et al. |
| 6,976,226 B1 | 12/2005 | Strong et al. |
| 6,989,819 B2 | 1/2006 | Hinckley et al. |
| 7,009,626 B2 | 3/2006 | David et al. |
| 7,015,894 B2 | 3/2006 | Morohoshi |
| 7,030,860 B1 | 4/2006 | Hsu et al. |
| 7,050,410 B1 | 5/2006 | Kim et al. |
| 7,065,707 B2 | 6/2006 | Chen et al. |
| 7,069,055 B1 | 6/2006 | Lee |
| 7,071,919 B2 | 7/2006 | Hinckley et al. |
| 7,072,984 B1 | 7/2006 | Polonsky et al. |
| 7,079,871 B2 | 7/2006 | Kim |
| 7,081,866 B2 | 7/2006 | Nakano et al. |
| 7,085,637 B2 | 8/2006 | Breed et al. |
| 7,109,978 B2 | 9/2006 | Gillespie et al. |
| 7,117,453 B2 | 10/2006 | Drucker et al. |
| 7,123,945 B2 | 10/2006 | Kokubo |
| 7,152,210 B1 | 12/2006 | Van Den Hoven et al. |
| 7,173,623 B2 | 2/2007 | Calkins et al. |
| 7,184,064 B2 | 2/2007 | Zimmerman et al. |
| 7,193,609 B2 | 3/2007 | Lira |
| 7,197,718 B1 | 3/2007 | Westerman et al. |
| 7,200,792 B2 | 4/2007 | Kim et al. |
| 7,250,939 B2 | 7/2007 | Lira |
| 7,254,775 B2 | 8/2007 | Geaghan et al. |
| 7,283,129 B1 | 10/2007 | Sawada et al. |
| 7,286,141 B2 | 10/2007 | Rieffel et al. |
| 7,296,243 B2 | 11/2007 | Lira |
| 7,337,412 B2 | 2/2008 | Guido et al. |
| 7,346,850 B2 | 3/2008 | Swartz et al. |
| 7,355,620 B2 | 4/2008 | Ikehata et al. |
| 7,362,867 B1 | 4/2008 | Kim et al. |
| 7,382,139 B2 | 6/2008 | Mackey |
| 7,386,001 B1 | 6/2008 | Kim et al. |
| 7,411,575 B2 | 8/2008 | Hill et al. |
| 7,432,908 B2 | 10/2008 | Rutledge et al. |
| 7,446,783 B2 | 11/2008 | Grossman |
| 7,447,516 B2 | 11/2008 | Heo et al. |
| 7,450,113 B2 | 11/2008 | Gillespie et al. |
| 7,450,114 B2 | 11/2008 | Anwar |
| 7,456,893 B2 | 11/2008 | Son et al. |
| 7,458,017 B2 | 11/2008 | Chen et al. |
| 7,469,381 B2 | 12/2008 | Ording |
| 7,479,949 B2 | 1/2009 | Jobs et al. |
| 7,487,444 B2 | 2/2009 | Lira |
| 7,500,188 B1 | 3/2009 | Trapani et al. |
| 7,511,702 B2 | 3/2009 | Hotelling |
| 7,532,205 B2 | 5/2009 | Gillespie et al. |
| 7,551,187 B2 | 6/2009 | Agrawala et al. |
| 7,561,159 B2 | 7/2009 | Abel et al. |
| 7,576,732 B2 | 8/2009 | Lii |
| 7,577,460 B2 | 8/2009 | Hotta |
| D602,016 S | 10/2009 | Hotelling et al. |
| 7,603,408 B1 | 10/2009 | McGinnis et al. |
| 7,610,182 B2 | 10/2009 | Smith et al. |
| 7,612,786 B2 | 11/2009 | Vale et al. |
| 7,658,675 B2 | 2/2010 | Hotta |
| 7,663,607 B2 | 2/2010 | Hotelling et al. |
| 7,663,610 B2 | 2/2010 | Kim et al. |
| 7,669,134 B1 | 2/2010 | Christie et al. |
| 7,675,941 B2 | 3/2010 | Kim et al. |
| 7,698,711 B2 | 4/2010 | Jeong |
| D618,677 S | 6/2010 | Andre et al. |
| 7,735,016 B2 | 6/2010 | Celik et al. |
| 7,747,782 B2 | 6/2010 | Hunt et al. |
| 7,786,975 B2 | 8/2010 | Ording et al. |
| 7,812,828 B2 | 10/2010 | Westerman et al. |
| D627,790 S | 11/2010 | Chaudhri |
| 7,844,913 B2 | 11/2010 | Amano et al. |
| 7,853,891 B2 | 12/2010 | Chaudhri et al. |
| 7,863,533 B2 | 1/2011 | Hamel et al. |
| 7,872,640 B2 | 1/2011 | Lira |
| 8,217,907 B2 | 7/2012 | Kim et al. |
| 8,274,482 B2 | 9/2012 | Kim et al. |
| 8,346,623 B2 | 1/2013 | Olexa |
| 8,429,565 B2 | 4/2013 | Agarawala et al. |
| 8,648,801 B2 | 1/2014 | Lira |
| 8,689,128 B2 | 4/2014 | Chaudhri et al. |
| 8,739,063 B2 | 5/2014 | Reid et al. |
| 2001/0024195 A1 | 9/2001 | Hayakawa |
| 2001/0028369 A1 | 10/2001 | Gallo et al. |
| 2001/0032254 A1 | 10/2001 | Hawkings |
| 2001/0043238 A1 | 11/2001 | Guerrero |
| 2001/0045949 A1 | 11/2001 | Chithamharam et al. |
| 2001/0047394 A1 | 11/2001 | Kloba et al. |
| 2001/0051943 A1 | 12/2001 | Drucker et al. |
| 2002/0011990 A1 | 1/2002 | Anwar |
| 2002/0015024 A1 | 2/2002 | Westerman et al. |
| 2002/0024506 A1 | 2/2002 | Flack et al. |
| 2002/0030667 A1* | 3/2002 | Hinckley .............. C08F 236/12 345/173 |
| 2002/0030844 A1 | 3/2002 | Tuli |
| 2002/0036618 A1 | 3/2002 | Wakai |
| 2002/0067346 A1 | 6/2002 | Mouton |
| 2002/0069296 A1 | 6/2002 | Aua et al. |
| 2002/0135602 A1 | 9/2002 | Davis et al. |
| 2002/0141643 A1 | 10/2002 | Jaeger |
| 2002/0154166 A1 | 10/2002 | Sanders et al. |
| 2002/0165647 A1 | 11/2002 | Glenn, III et al. |
| 2002/0167481 A1 | 11/2002 | Wong et al. |
| 2002/0180763 A1 | 12/2002 | Kung |
| 2002/0186251 A1 | 12/2002 | Himmel et al. |
| 2002/0189763 A1 | 12/2002 | Kwon et al. |
| 2002/0190956 A1* | 12/2002 | Klein .................... G06F 1/1626 345/169 |
| 2003/0005302 A1 | 1/2003 | Searle |
| 2003/0014445 A1 | 1/2003 | Formanek et al. |
| 2003/0037076 A1 | 2/2003 | Bravery |
| 2003/0048251 A1 | 3/2003 | Liang et al. |
| 2003/0095096 A1 | 5/2003 | Robbin et al. |
| 2003/0103156 A1 | 6/2003 | Brake et al. |
| 2003/0110485 A1 | 6/2003 | Lu et al. |
| 2003/0122787 A1 | 7/2003 | Zimmerman et al. |
| 2003/0132909 A1 | 7/2003 | Haynes |
| 2003/0132959 A1 | 7/2003 | Simister et al. |
| 2003/0160814 A1 | 8/2003 | Brown |
| 2003/0160832 A1 | 8/2003 | Ridgley et al. |
| 2003/0174149 A1 | 9/2003 | Fujisaki |
| 2003/0184525 A1 | 10/2003 | Tsai |
| 2003/0231168 A1 | 12/2003 | Bell et al. |
| 2003/0237053 A1 | 12/2003 | Chen et al. |
| 2004/0021698 A1 | 2/2004 | Baldwin et al. |
| 2004/0034801 A1 | 2/2004 | Jaeger |
| 2004/0049737 A1 | 3/2004 | Hunt et al. |
| 2004/0056839 A1 | 3/2004 | Yoshihara |
| 2004/0100479 A1 | 5/2004 | Nakano et al. |
| 2004/0103371 A1 | 5/2004 | Chen et al. |
| 2004/0107403 A1 | 6/2004 | Tetzchner |
| 2004/0125088 A1 | 7/2004 | Zimmerman |
| 2004/0160458 A1 | 8/2004 | Sterling et al. |
| 2004/0167919 A1 | 8/2004 | Sterling et al. |
| 2004/0189600 A1 | 9/2004 | Hinckley et al. |
| 2004/0194014 A1 | 9/2004 | Anwar |
| 2004/0196269 A1 | 10/2004 | Dotson |
| 2004/0205504 A1 | 10/2004 | Phillips |
| 2004/0215643 A1 | 10/2004 | Brecher et al. |
| 2004/0222992 A1 | 11/2004 | Calkins et al. |
| 2004/0224638 A1 | 11/2004 | Fadell et al. |
| 2005/0041385 A1 | 2/2005 | Kikinis et al. |
| 2005/0057524 A1 | 3/2005 | Hill et al. |
| 2005/0080682 A1 | 4/2005 | Wilson |
| 2005/0088418 A1 | 4/2005 | Westerman et al. |
| 2005/0088443 A1 | 4/2005 | Blanco et al. |
| 2005/0122806 A1 | 6/2005 | Arakawa et al. |
| 2005/0168353 A1 | 8/2005 | Dement et al. |
| 2005/0183026 A1 | 8/2005 | Amano et al. |
| 2005/0193015 A1 | 9/2005 | Logston et al. |
| 2005/0195154 A1 | 9/2005 | Robbins et al. |
| 2005/0273723 A1 | 12/2005 | Sharpe |
| 2005/0275636 A1 | 12/2005 | Dehlin et al. |
| 2006/0001652 A1 | 1/2006 | Chiu et al. |
| 2006/0010400 A1 | 1/2006 | Dehlin et al. |
| 2006/0026521 A1 | 2/2006 | Hotelling et al. |
| 2006/0038796 A1 | 2/2006 | Hinckley |

(56) References Cited

U.S. PATENT DOCUMENTS

| | | |
|---|---|---|
| 2006/0048071 A1 | 3/2006 | Jarrett et al. |
| 2006/0084852 A1 | 4/2006 | Mason et al. |
| 2006/0097991 A1 | 5/2006 | Hotelling et al. |
| 2006/0101354 A1 | 5/2006 | Hashimoto et al. |
| 2006/0190833 A1 | 8/2006 | SanGiovanni et al. |
| 2006/0236263 A1 | 10/2006 | Bathiche et al. |
| 2006/0268020 A1 | 11/2006 | Han |
| 2007/0028191 A1 | 2/2007 | Tsuji |
| 2007/0035513 A1 | 2/2007 | Sherrard et al. |
| 2007/0055967 A1 | 3/2007 | Poff et al. |
| 2007/0064004 A1 | 3/2007 | Bonner et al. |
| 2007/0075965 A1 | 4/2007 | Huppi et al. |
| 2007/0081726 A1 | 4/2007 | Westerman et al. |
| 2007/0132789 A1 | 6/2007 | Ording et al. |
| 2007/0146337 A1 | 6/2007 | Ording et al. |
| 2007/0149252 A1 | 6/2007 | Jobs et al. |
| 2007/0152984 A1 | 7/2007 | Ording et al. |
| 2007/0157089 A1 | 7/2007 | Van Os et al. |
| 2007/0157094 A1 | 7/2007 | Van Os et al. |
| 2007/0182743 A1 | 8/2007 | Aguera y Arcas |
| 2007/0185876 A1 | 8/2007 | Howard |
| 2007/0252821 A1 | 11/2007 | Hollernans et al. |
| 2007/0256026 A1 | 11/2007 | Klassen et al. |
| 2007/0262964 A1 | 11/2007 | Zotov et al. |
| 2007/0288856 A1 | 12/2007 | Butlin et al. |
| 2008/0005703 A1 | 1/2008 | Radivojevic et al. |
| 2008/0013826 A1 | 1/2008 | Hillis et al. |
| 2008/0016096 A1 | 1/2008 | Wilding et al. |
| 2008/0030477 A1 | 2/2008 | Lira |
| 2008/0034029 A1 | 2/2008 | Guido et al. |
| 2008/0052945 A1 | 3/2008 | Matas |
| 2008/0062207 A1 | 3/2008 | Park |
| 2008/0077880 A1 | 3/2008 | Oygard |
| 2008/0094369 A1 | 4/2008 | Ganatra et al. |
| 2008/0048978 A1 | 7/2008 | Ording et al. |
| 2008/0168395 A1 | 7/2008 | Ulrnann et al. |
| 2008/0168404 A1 | 7/2008 | Ording |
| 2008/0231610 A1 | 9/2008 | Hotelling et al. |
| 2009/0244020 A1 | 10/2009 | Sjolin |
| 2009/0249252 A1 | 10/2009 | Lunday et al. |
| 2009/0284478 A1 | 11/2009 | De La Torre et al. |
| 2009/0307623 A1 | 12/2009 | Agarawala et al. |
| 2010/0172624 A1 | 7/2010 | Watts |
| 2011/0024195 A1 | 2/2011 | Hoyer et al. |
| 2011/0037725 A1 | 2/2011 | Pryor |
| 2011/0141142 A1 | 6/2011 | Leffert et al. |
| 2011/0145754 A1 | 6/2011 | Lira |
| 2013/0076786 A1 | 3/2013 | Lira |
| 2013/0113746 A1 | 5/2013 | Lira |
| 2013/0120299 A1 | 5/2013 | Lira |
| 2013/0120300 A1 | 5/2013 | Lira |
| 2013/0120301 A1 | 5/2013 | Lira |
| 2013/0135291 A1 | 5/2013 | Davidson |
| 2013/0139098 A1 | 5/2013 | Lira |
| 2013/0139101 A1 | 5/2013 | Lira |
| 2013/0181920 A1 | 7/2013 | Lira |
| 2013/0185628 A1 | 7/2013 | Lira |
| 2017/0277401 A1 | 9/2017 | Lira |

FOREIGN PATENT DOCUMENTS

| | | |
|---|---|---|
| EP | 0493128 | 7/1992 |
| EP | 0626635 | 11/1994 |
| EP | 0701220 | 3/1996 |
| EP | 0725331 | 7/1996 |
| EP | 0944218 | 9/1999 |
| EP | 1517228 | 3/2005 |
| EP | 2069877 | 6/2009 |
| FR | 2830093 | 3/2003 |
| GB | 2319591 | 5/1998 |
| GB | 2335105 | 8/1999 |
| GB | 2347200 | 8/2000 |
| JP | S63-146168 | 6/1988 |
| JP | S63-206827 | 8/1988 |
| JP | H02-140822 | 5/1990 |
| JP | H03-271976 | 3/1991 |
| JP | H05-100809 | 7/1995 |
| JP | H07-182134 | 7/1995 |
| JP | H07-230352 | 8/1995 |
| JP | H08-249114 | 9/1996 |
| JP | H09-160713 | 6/1997 |
| JP | H09-237175 | 9/1997 |
| JP | H10-161628 | 6/1998 |
| JP | H10-240220 | 9/1998 |
| JP | H11-327733 | 1/1999 |
| JP | H11-126149 | 5/1999 |
| JP | 2000-163031 | 6/2000 |
| JP | 2000-163193 | 6/2000 |
| JP | 2000-181428 | 6/2000 |
| JP | 2000-322495 | 11/2000 |
| JP | 2000-333044 | 11/2000 |
| JP | 2001-290585 | 10/2001 |
| JP | 2001-318665 | 11/2001 |
| JP | 2002-254614 | 9/2002 |
| JP | 2002-323850 | 11/2002 |
| JP | 2002-342033 | 11/2002 |
| JP | 2003-108279 | 4/2003 |
| JP | 2003-140802 | 5/2003 |
| JP | 2003-288151 | 10/2003 |
| JP | 2003-330613 | 11/2003 |
| JP | 2003-344059 | 12/2003 |
| JP | 2003-345491 | 12/2003 |
| JP | 2004-310388 | 11/2004 |
| JP | 2005-515530 | 5/2005 |
| JP | 2005-234199 | 9/2005 |
| JP | 2005-267631 | 9/2005 |
| JP | 2005-284726 | 10/2005 |
| JP | 2006-090962 | 4/2006 |
| JP | 2006-154892 | 6/2006 |
| JP | 2006-179006 | 7/2006 |
| JP | 2006-244353 | 9/2006 |
| KR | 2002-0038177 | 5/2002 |
| KR | 2002-0081953 | 10/2002 |
| KR | 2002-0095992 | 12/2002 |
| KR | 2003-0088374 | 11/2006 |
| WO | WO 94/29788 | 12/1994 |
| WO | WO 98/06054 | 2/1998 |
| WO | WO 98/07112 | 2/1998 |
| WO | WO 99/28812 | 6/1999 |
| WO | WO 01/029702 | 4/2001 |
| WO | WO 01/77792 | 10/2001 |
| WO | WO 02/008881 | 1/2002 |
| WO | WO 03/023593 | 3/2003 |
| WO | WO 03/060622 | 7/2003 |
| WO | WO 03/081458 | 10/2003 |
| WO | WO 04/001560 | 12/2003 |
| WO | WO 05/052773 | 6/2005 |
| WO | WO 06/003591 | 1/2006 |
| WO | WO 06/020305 | 2/2006 |
| WO | WO 06/045530 | 5/2006 |
| WO | WO 08/030563 | 3/2008 |
| WO | WO 08/085848 | 7/2008 |
| WO | WO 08/085871 | 7/2008 |
| WO | WO 08/086218 | 7/2008 |
| WO | WO 11/045805 | 4/2011 |

OTHER PUBLICATIONS

U.S. Appl. No. 13/730,684, dated Jul. 18, 2014, Office Action.
U.S. Appl. No. 13/730,693, dated Jun. 18, 2014, Office Action.
U.S. Appl. No. 13/731,335, dated Jun. 24, 2014, Office Action.
U.S. Appl. No. 13/731,351, dated Sep. 8, 2014, Office Action.
U.S. Appl. No. 13/731,392, dated Jun. 9, 2014, Notice of Allowance.
U.S. Appl. No. 13/730,684, dated Feb. 24, 2015, Office Action.
U.S. Appl. No. 13/730,693, dated Feb. 18, 2015, Notice of Allowance.
U.S. Appl. No. 13/731,335, dated Apr. 24, 2015, Notice of Allowance.
U.S. Appl. No. 13/731,351, dated Mar. 2, 2015, Office Action.
U.S. Appl. No. 13/730,726, dated Dec. 26, 2014, Office Action.
U.S. Appl. No. 13/731,364, dated Oct. 9, 2014, Office Action.

(56) References Cited

OTHER PUBLICATIONS

U.S. Appl. No. 09/842,474, filed Apr. 25, 2001, Polonsky.
U.S. Appl. No, 09/843,036, filed Apr. 25, 2001, Trapani et al.
U.S. Appl. No. 13/616,447, filed Sep. 14, 2012, Lira.
U.S. Appl. No. 13/616,476, filed Sep. 14, 2012, Lira.
U.S. Appl. No. 13/616,490, filed Sep. 14, 2012, Lira.
U.S. Appl. No. 13/619,079, filed Sep. 14, 2012, Lira.
U.S. Appl. No. 13/619,113, filed Sep. 14, 2012, Lira.
U.S. Appl. No. 13/619,141, filed Sep. 14, 2012, Lira.
FOLDOC Defintion, "Internet", Feb. 21, 2000, pp. 1, http://wombat.doc.oc.ac.uk/foldoc.cgi?query=inernet.
Webopedia Definition, "WAP", Apr. 7, 2001, pp. 1-3, http://web.archive.org/web/20010407102038/http://webopedia.com/term/w/wap.html.
Webopedia Definition, "WML", Nov. 9, 2001, pp. 1, http://www.webopedia.com/term/w/wml.html.
Hori, et al., "Annotation-based Web content transcoding," Computer Network 33 (2000) 197-211.
Handbook for the WorkPad c3 PC Companion, first released Mar. 1999.
U.S. Appl. No. 10/307,403, dated Sep. 22, 2006, Notice of Allowance.
U.S. Appl. No. 11/830,566, dated Jun. 6, 2013, Office Action.
U.S. Appl. No. 10/307,324, dated Mar. 2, 2006, Office Action.
U.S. Appl. No. 10/307,324, dated Aug. 15, 2006, Office Action.
U.S. Appl. No. 10/307,324, dated Mar. 23, 2007, Notice of Allowance.
U.S. Appl. No. 10/307,417, dated Apr. 8, 2005, Office Action.
U.S. Appl. No. 10/307,417, dated Nov. 2, 2005, Office Action.
U.S. Appl. No. 10/307,417, dated Apr. 5, 2006, Office Action.
U.S. Appl. No. 10/307,417, dated Oct. 11, 2006, Office Action.
U.S. Appl. No. 10/307,417, dated Apr. 17, 2007, Office Action.
U.S. Appl. No. 10/307,417, dated Mar. 17, 2008, Office Action.
U.S. Appl. No. 10/307,417, dated Sep. 22, 2008, Notice of Allowance.
U.S. Appl. No. 10/307,418, dated Feb. 10, 2006, Office Action.
U.S. Appl. No. 10/307,418, dated Jul. 28, 2006, Office Action.
U.S. Appl. No. 10/307,418, dated Dec. 12, 2006, Office Action.
U.S. Appl. No. 10/307,418, dated Jun. 28, 2007, Notice of Allowance.
U.S. Appl. No. 10/307,418, dated Sep. 20, 2007, Notice of Allowance.
U.S. Appl. No. 11/617,997, dated Sep. 18, 2009, Office Action.
U.S. Appl. No. 11/617,997, dated Mar. 25, 2010, Office Action.
U.S. Appl. No. 11/617,997, dated Sep. 13, 2010, Notice of Allowance.
U.S. Appl. No. 11/830,566, dated Nov. 23, 2011, Office Action.
U.S. Appl. No. 11/830,566, dated Jun. 13, 2012, Office Action.
U.S. Appl. No. 11/830,566, dated Sep. 20, 2012, Office Action.
U.S. Appl. No. 12/963,444, dated May 9, 2013, Office Action.
U.S. Appl. No. 12/963,444, dated Jan. 3, 2014, Office Action.
U.S. Appl. No. 13/683,828, dated May 9, 2013, Office Action.
U.S. Appl. No. 13/730,684, dated Jul. 18, 2013, Office Action.
U.S. Appl. No. 13/730,684, dated Jan. 6, 2014, Office Action.
U.S. Appl. No. 13/730,693, dated Feb. 27, 2013, Office Action.
U.S. Appl. No. 13/730,693, dated Jul. 15, 2013, Office Action.
U.S. Appl. No. 13/730,693, dated Nov. 20, 2013, Office Action.
U.S. Appl. No. 13/730,707, dated Apr. 25, 2013, Office Action.
U.S. Appl. No. 13/730,707, dated Oct. 1, 2013, Office Action.
U.S. Appl. No. 13/730,726, dated Jul. 9, 2013, Office Action.
U.S. Appl. No. 13/730,726, dated Feb. 13, 2014, Office Action.
U.S. Appl. No. 13/731,335, dated Feb. 26, 2013, Office Action.
U.S. Appl. No. 13/731,335, dated Jul. 26, 2013, Office Action.
U.S. Appl. No. 13/731,335, dated Nov. 15, 2013, Office Action.
U.S. Appl. No. 13/731,351, dated May 23, 2013, Office Action.
U.S. Appl. No. 13/731,351, dated Dec. 6, 2013, Office Action.
U.S. Appl. No. 13/731,364, dated Feb. 27, 2013, Office Action.
U.S. Appl. No. 13/731,364, dated Sep. 9, 2013, Office Action.
U.S. Appl. No. 13/731,382, dated Jun. 6, 2013, Office Action.
U.S. Appl. No. 13/731,382, dated Dec. 18, 2013, Office Action.
U.S. Appl. No. 13/731,392, dated Mar. 7, 2013, Office Action.
U.S. Appl. No. 13/731,392, dated Jul. 26, 2013, Office Action.
U.S. Appl. No. 13/731,392, dated Nov. 6, 2013, Office Action.
U.S. Appl. No. 13/730,726, dated Nov. 19, 2015, Notice of Allowance.
U.S. Appl. No. 13/730,726, dated Feb. 29, 2016, Notice of Allowance.
U.S. Appl. No. 12/963,444, dated Jan. 13, 2017, Notice of Allowance.
U.S. Appl. No. 13/731,382, dated Jan. 10, 2017, Notice of Allowance.
Notice of Intent to Issue a Reexarn Certificate Issued in U.S. Appl. No. 90/012,304 dated Jun. 12, 2013.
Examiner Interview Summary Record Issued in U.S. Appl. No. 90/012,304 dated Jun. 12, 2013.
Amendment After Final or under 37CFR 1.312, initiated by the Examiner Issued in U.S. Appl. No. 90/012,304 dated Jun. 12, 2013.
Reexam Response to Final Rejection, Issued in U.S. Appl. No. 90/012,304 dated May 13, 2013.
Reexam, Miscellaneous Incoming Letter, Issued in U.S. Appl. No. 90/012,304, dated May 3, 2013.
Reexam—Final Rejection, Issued in U.S. Appl. No. 90/012,304, dated Mar. 29, 2013.
Affadavit—submitted prior to Mar. 15, 2013, Issued in U.S. Appl. No. 90/012,304, dated Jan. 15, 2013, 51 pages.
Amendment/Req. Reconsideration—After Non-Final Reject, Issued in U.S. Appl. No. 90/012,304 dated Jan. 15, 2013.
Affadavit—submitted prior to Mar 15, 2013, Issued in U.S. Appl. No. 90/012,304, dated Jan. 15, 2013, 30 pages.
Determination—Reexarn Ordered, Issued in U.S. Appl. No. 90/012,304 dated Jul. 30, 2012.
Reexam Litigation Search Conducted, Issued in U.S. Appl. No. 90/012,304 dated Jun. 14, 2012.
Reexam—Affidavit/Decl/Exhibit Filed by 3rd Party, Issued in U.S. Appl. No. 90/012,304 on May 23, 2012, 29 pages.
Reexam—Affidavit/Decl/Exhibit Filed by 3rd Party, Issued in U.S. Appl. No. 90/012,304 on May 23, 2012, 101 pages.
Reexam—Affidavit/Decl/Exhibit Filed by 3rd Party, Issued in U.S. Appl. No. 90/012,304 on May 23, 2012, 48 pages.
Receipt of Orig. Ex Parte Request by Third Party, Issued in U.S. Appl. No. 90/012,304 on May 23, 2012, 89 pages.
Jury Trial Demand, Complaint for Patent Infringement, Federal False Designation of Origin and Unfair Competition . . . *Apple Inc.* v. *Samsung Electronics Co. LTD.*, USDC N. District of California, Case: 11-cv-01846-LHK, filed Apr. 15, 2011.
U.S. Trademark Reg. No. 3,470,983, Registered Jul. 22, 2008, from United States Patent and Trademark Office.
U.S. Trademark Reg. No. 3,457,218, Registered Jul. 1, 2008, from United States Patent and Trademark Office.
U.S. Trademark Reg. No. 3,475,327, Registered Jul. 29, 2008, from United States Patent and Trademark Office.
U.S. Trademark Reg. No. 3,886,196, Registered Dec. 7, 2010, from United States Patent and Trademark Office.
U.S. Trademark Reg. No. 3,889,642, Registered Dec. 14, 2010, from United States Patent and Trademark Office.
U.S. Trademark Reg. No. 3,886,200 Registered Dec. 7, 2010, from United States Patent and Trademark Office.
U.S. Trademark Reg. No. 3,889,685 Registered Dec. 14, 2010, from United States Patent and Trademark Office.
U.S. Trademark Reg. No. 3,886,169 Registered Dec. 7, 2010, from United States Patent and Trademark Office.
U.S. Trademark Reg. No. 3,886,197 Registered Dec. 7, 2010, from United States Patent and Trademark Office.
U.S. Trademark Reg. No. 2,935,038 Registered Mar. 22, 2005, from United States Patent and Trademark Office.
Declaration of Todd M. Briggs in Support of Sarnsung's Motion to Compel Apple . . ., *Apple Inc.* v. *Samsung Electronics Co. LTD.*, USDC N. District of California, Case: 11-cv-01846-LHK, filed May 27, 2011.
Jury Trial Demand, Amended Complaint for Designation of Origin and Unfair Competition . . ., *Apple Inc.* v. *Samsung Electronics Co. LTD.*, USDC N. District of California, Case: 11-cv-01846-LHK, filed Jun. 16, 2011.

(56) References Cited

OTHER PUBLICATIONS

Samsung Entities' Answer, Affirmative Defenses, and Counterclaims . . ., *Apple Inc. v. Samsung Electronics Co. LTD.*, USDC N. District of California, Case: 11-cv-01846-LHK, filed Jun. 30, 2011.
Apple's Stipulated Administrative Motion to File Documents Under Seal, *Apple Inc. v. Samsung Electronics Co. LTD.*, USDC N. District of California, Case: 11-cv-01846-LHK, filed Jul. 1, 2011.
Declaration of Patrick J. Zhang in Support of Apple's Motion for a Preliminary Injunction, *Apple Inc. v. Samsung Electronics Co. LTD.*, USDC N. District of California, Case: 11-cv-01846-LHK, filed Jul. 1, 2011.
Declaration of Jason R. Bartlett in Support of Apple Inc.'s Motion for a Preliminary Injunction, *Apple Inc. v. Samsung Electronics Co. LTD.*, USDC N. District of California, Case: 11-cv-01846-LHK, filed Jul. 1, 2011.
Declaration of Sissie Twiggs in Support of Apple Inc.'s Motion for a Preliminary Injunction, *Apple Inc. v. Samsung Electronics Co. LTD.*, USDC N. District of California, Case: 11-cv-01846-LHK, filed Jul. 1, 2011.
Declaration of Cooper C. Woodring in Support of Apple's Motion for a Preliminary Injunction, *Apple Inc. v. Samsung Electronics Co. LTD.*, USDC N. District of California, Case: 11-cv-01846-LHK, filed Jul. 1, 2011.
Declaration of Ravin Balakrishnan, Ph. D. In support of Apple's Motion for a Preliminary Injunction, *Apple Inc. v. Samsung Electronics Co. LTD.*, USDC N. District of California, Case: 11-cv-01846-LHK, filed Jul. 1, 2011.
Declaration of Austin Tarango in Support of Samsung's Opposition to Apple's Motion . . . *Apple Inc. v. Samsung Electronics Co. LTD.*, USDC N. District of California, Case: 11-cv-01846-LHK, filed Jul. 15, 2011.
Jury Trial Demanded, Counterclaim Defendant Apple Inc.'s Answer, Defenses, and Counterclaims in Reply to Samsung's Counterclaims, *Apple Inc. v. Samsung Electronics Co. LTD.*, USDC N. District of California, Case: 11-cv-01846-LHK, filed Jul. 21, 2011.
Samsung's Motion to Dismiss and Strike Apple's Counterclaims, *Apple Inc. v. Samsung Electronics Co. LTD.*, USDC N. District of California, Case: 11-cv-01846-LHK, filed Aug. 15, 2011.
Declaration of Benjamin B. Bederson, *Apple Inc. v. Samsung Electronics Co. LTD.*, USDC N. District of California, Case: 11-cv-01846-LHK, filed Aug. 22, 2011.
Declaration of Roger Fidler in Support of Samsung's Opposition to Apple's Motion for Preliminary Injunction, *Apple Inc. v. Samsung Electronics Co. LTD.*, USDC N. District of California, Case: 11-cv-01846-LHK, filed Aug. 22, 2011.
Declaration of Nicholas P. Godici in Support of Samsung's Opposition to Apple's Motion for a Preliminary Injunction, *Apple Inc. v. Samsung Electronics Co. LTD.*, USDC N. District of California, Case: 11-cv-01846-LHK, filed Aug. 22, 2011.
Declaration of Andries Van Dam, Ph. D. in Support of Samsung's Opposition to Apple's Motion for a Preliminary Injunction, *Apple Inc. v. Samsung Electronics Co. LTD.*, USDC N. District of California, Case: 11-cv-01846-LHK, filed Aug. 22, 2011.
Declaration of Itay Sherman in Support of Samsung's Opposition to Apple's Motion for a Preliminary Injunction, *Apple Inc. v. Samsung Electronics Co. LTD.*, USDC N. District of California, Case: 11-cv-01846-LHK, filed Aug. 22, 2011.
Declaration of Sara Jenkins in Support of Samsung's Opposition to Apple's Motion for a Preliminary Injunction, *Apple Inc. v. Samsung Electronics Co. LTD.*, USDC N. District of California, Case: 11-cv-01846-LHK, filed Aug. 23, 2011.
Samsung's Motion to Compel Apple to Produce Documents and Things in Response to Samsung's Request . . ., *Apple Inc. v. Samsung Electronics Co. LTD.*, USDC N. District of California, Case: 11-cv-01846-LHK, filed Sep. 1, 2011.
Brief Amicus Curiae Cellco Partnership Regarding Apple's Motion for a Preliminary Injunction, *Apple Inc. v. Samsung Electronics Co. LTD.*, USDC N. District of California, Case: 11-cv-01846-LHK, filed Sep. 23, 2011.
Brief of Amicus Curiae T-Mobile USA, Inc. Regarding Apple's Motion for a Preliminary Injunction, *Apple Inc. v. Samsung Electronics Co. LTD.*, USDC N. District of California, Case: 11-cv-01846-LHK, filed Sep. 28, 2011.
Counterclaim Defendant Apple Inc.'s Amended Answer, Defenses, and Counterclaims in Reply . . ., *Apple Inc. v. Samsung Electronics Co. LTD.*, USDC N. District of California, Case: 11-cv-01846-LHK, filed Nov. 11, 2011.
Joint Claim Construction and Prehearing Statement Pusuant to Patent L.R. 4-3, *Apple Inc. v. Samsung Electronics Co. LTD.*, USDC N. District of California, Case: 11-cv-01846-LHK, filed Nov. 14, 2011.
Apple's Opening Claim Construction Brief Pursuant to Patent L.R. 4-5, *Apple Inc. v. Samsung Electronics Co. LTD.*, USDC N. District of California, Case: 11-cv-01846-LHK, filed Dec. 8, 2011.
Declaration of Deok Keun Matthew Ahn in Support of Apple's Opening Claim Construction Brief Pursuant to Patent L.R. 4-5, *Apple Inc. v. Samsung Electronics Co. LTD.*, USDC N. District of California, Case: 11-cv-01846-LHK, filed Dec. 8, 2011.
Office Action Response in U.S. Appl. No. 08/821,004, dated Nov. 8, 1999.
Office Action Response in U.S. Appl. No. 08/821,004, dated Jun. 28, 2000.
Deposition of Expert Witness 'Andries Van Dam' in *Apple Inc. v. Samsung Electronics Co. LTD.*, USDC N. District of California, Case: 11-cv-01846-LHK, dated Sep. 14, 2011.
Videotaped Deposition of Ravin Balakrishnan, Ph.D. in *Apple Inc. v. Samsung Electronics Co. LTD* ., USDC N. District of California, Case: 11-cv-01846-LHK, dated Aug. 16, 2011.
Reply Declaration of Ravin Balakrishnan, Ph.D. in Support of Apple's Motion for a Preliminary Injunction, in *Apple Inc. v. Samsung Electronics Co. LTD.*, USDC N. District of California, Case: 11-cv-01846-LHK, dated Sep. 29, 2011.
Davies, ER., Machine Vision: Theory Algorithms Practicalities, 2nd edition, Chapter 11 (pp. 271-290), Academic Press (San Diego California) 1997.
Deposition of Wayne Westerman in *Apple Inc. v. Samsung Electronics Co. LTD.*, USDC N. District of California, Case: 11-cv-01846-LHK, dated Oct. 31, 2011.
Office Action in U.S. Appl. No. 11/677,958 dated Feb. 2, 2010.
Videotaped Deposition of Irnran Chaudhri in *Apple Inc. v. Samsung Electronics Co. LTD.*, USDC N. District of California, Case: 11-cv-01846-LHK, dated Oct. 14, 2011.
Apple's Reply Claim Construction Brief Pursuant to Patent L.R. 4-5, in *Apple Inc. v. Samsung Electronics Co. LTD.*, USDC N. District of California, Case: 11-cv-01846-LHK, dated Dec. 29, 2011.
Reply Declaration of Deok Keun Matthew An in Support of Apple's Reply Claim Construction Brief Pursuant to Patent L.R. 4-5, in *Apple Inc. v. Samsung Electronics Co. LTD.*, USDC N. District of California, Case: 11-cv-01846-LHK, dated Dec. 29, 2011.
Appeal Brief in Support of Appellants' Appeal to the Board of Patent Appeals and Interferences in U.S. Appl. No. 08/821,004 dated Aug. 31, 2001.
Prehearing and Tutorial in the Matter of: Certain Mobile Devices and Related Software Before the United States International Trade Commission, Investigation No. 337-TA-750, dated Sep. 23, 2011.
Corrected Witness Statement of Dr. Ravin Balakrishnan in the Matter of Certain Mobile Devices and Related Software in Investigation No. 337-TA-750, dated Aug. 22, 2011.
Pre-Trial Statement and Brief of the Commission Investigative Staff in the Matter of Certain Mobile Devices and Related Software in Investigation No. 337-TA-750, Dated Sep. 9, 2011.
Declaration of Joe Tipton Cole in Support of Samsung's Proposed Claim Construction for U.S. Pat. No. 7,689,711, in *Apple Inc. v. Samsung Electronics Co. LTD.*, USDC N. District of California, Case: 11-cv-01846-LHK, dated Nov. 28, 2011.
Declaration of Richard Wesel in Support of Samsung's Proposed Claim Construction for U.S. Pat. No. 7,200,792, in *Apple Inc. v. Samsung Electronics Co. LTD.*, USDC N. District of California, Case: 11-cv-01846-LHK, dated Jan. 20, 2012.

(56) References Cited

OTHER PUBLICATIONS

Samsung's Opening Claim Construction Brief in *Apple Inc. v. Samsung Electronics Co. LTD.*, USDC N. District of California, Case: 11-cv-01846-LHK, dated Dec. 8, 2011.
Declaration of Todd M. Briggs in Support of Samsung's Opening Claim Construction Brief, in *Apple Inc. v. Samsung Electronics Co. LTD.*, USDC N. District of California, Case: 11-cv-01846-LHK, dated Dec. 8, 2011.
Deposition of Jeesoo Jung, Sue Mi Jones, and Hun Kee Kim Ph. D., filed Jan. 6, 2012.
Samsung Electronics' IMT-2000 Asynchronous Technology Adopted as International Standard, Bum Soo Kim, Seoul Associated Press, dated Mar. 20, 2002.
Samsung Electronics' Asynchrononous IMT-2000 Technology Adopted as International Standard Specification, Hwi Jong Yoon, dated Sep. 20, 2002.
Videotaped Deposition of Richard D. Gitlin, in *Apple Inc. v. Samsung Electronics Co. LTD.*, USDC N. District of California, Case: 11-cv-01846-LHK, dated Dec. 6, 2011.
Data Communications Principles by Richard D. Gitlin, Jeremiah F. Hayes, Stephen B. Weinstein, published Sep. 30, 1992, pp. 72-80.
Videotaped Deposition of Tony Givargis, Ph. D., in *Apple Inc. v. Samsung Electronics Co. LTD.*, USDC N. District of California, Case: 11-cv-01846-LHK, dated Dec. 6, 2011.
Issue Notification issued in U.S. Appl. No. 11/778,466 dated Apr. 13, 2010.
Notice of Allowance issued in U.S. Appl. No. 11/778,466, dated Jan. 13, 2010.
Office Action issued in U.S. Appl. No. 11/778,466, dated Dec. 16, 2009.
Rough Transcript of the Deposition of Moon-Sang Jeong in *Apple Inc. v. Samsung Electronics Co. LTD.*, USDC N. District of California, Case: 11-cv-01846-LHK, dated Nov. 17, 2011.
MP3 Background Playing: IMP3BGMGR, IMEDIA Interface Applet & Interfaces, filed Jan. 6, 2011.
Kaplan, Steven M., "Wiley Electrical and Electronics Engineering Dictionary", IEEE Press, 2004.
Screenshots of "Applet" Definition with Defintion References from the Free Online Dictionary, last updated Sep. 19, 2011.
TechIMO.com, Windows 9x Question About 32-bit and 16-bit Software Installation, http://www.techinno.conniforunniapplications-operating-systems/123490-windows-9x-que . . . , dated Nov. 28, 2011.
The Code Project, Control Panel Applet Framework, Len Holgate, http://www.codeproject.corn/KB/winsdk/cjbcontrolpanelapplet.aspx, dated Nov. 28, 2011.
WinDrivers Computer Tech Support Forums, Run Control Panel Applets Directly at Command Level!, http://forunns.windrivers.conniarchive/indexphp/t-16754.html, dated Nov. 28, 2011.
PC Tools.corn, Hide Control Panel Applets at Registry Guide for Windows, http://www.pctools.conniguides/registry/detail/522/, dated Nov. 28, 2011.
Real Geek.corn, Control Panel Applet Missing—Windows XP Security & Administration, http://www.realgeek.conniforunns/control-panel-applet-missing-299659.html, dated Nov. 28, 2011.
GeekGirls.corn, Control Panel Shortcuts, http://www.geekgirls.corn/windowsxp_controlpanel.htrn, dated Nov. 28, 2011.
FreewareFiles.conn, Microsoft Color Control Panel Applet 1.0, http://www.freewarefiles.connirnicrosoft-color-control-panel-applet_prograrnn_16303.html, dated Nov. 28, 2011.
Softpedia, Download GetCodecs 1.0.1, http://linux.softpedia.conniget/Desktop-Environmentitoolsigetcodecs-5182.shtml. Dated Nov. 28, 2011.
Gnome Applets with Python, Arturo Gonzalez Ferrer, http://www.pygtk.orgiarticlesiapplets_arturogfi, dated Nov. 28, 2011.
Ubuntu Forums, New Applet: Desktop Drawers, http://ubuntuforurns.orgishowthread.php?t=909404, Nov. 28, 2011.
Just Skins "Anyone Using RegisterClass from Win32API?" from http://www.justskins.conniforunnsianyone-using-registerclass-from-33437.html, dated Nov. 28, 2011.

Top4Download.com "Stock Applets Script 1.0" from http://scripts.top4download.connistock-applets-scriptsiefiow.html, dated Nov. 28, 2011.
Siden, Larry, "Signed Applet Tutorial" from http://www.personal.unnich.edurlsidenitutorialsisigned-appletisigned-applet.html, dated, Nov. 28, 2011.
Declaration of Todd M. Briggs in support of Sarnsung's Reply Claim Construction Brief, in *Apple Inc. v. Samsung Electronics Co. LTD.*, USDC N. District of California, Case: 11-cv-01846-LHK, dated Dec. 29, 2011.
Videotaped Deposition of Tony Givargis, Ph.D., pp. 1, 5, 80, 81, 82, and 120, in *Apple Inc. v. Samsung Electronics Co. LTD.*, USDC N. District of California, Case: 11-cv-01846-LHK, dated Dec. 6, 2011.
Videotaped Deposition of Tony Givargis, Ph.D., pp. 1, 5, 35, 36, 37, 38, 39, 40, 41, 120, in *Apple Inc. v. Samsung Electronics Co. LTD.*, USDC N. District of California, Case: 11-cv-01846-LHK, dated Dec. 6, 2011.
Videotaped Deposition of Tony Givargis, Ph.D., pp. 1, 5, 39, 40, 41, 42, 120, in *Apple Inc. v. Samsung Electronics Co. LTD.*, USDC N. District of California, Case: 11-cv-01846-LHK, dated Dec. 6, 2011.
Videotaped Deposition of Tony Givargis, Ph.D., pp. 1, 5, 40, 41, 42, 43, 120, in *Apple Inc. v. Samsung Electronics Co. LTD.*, USDC N. District of California, Case: 11-cv-01846-LHK, dated Dec. 6, 2011.
Videotaped Deposition of Tony Givargis, Ph.D., pp. 1, 5, 69, 70, 71, 72, 73, 74, 120, in *Apple Inc. v. Samsung Electronics Co. LTD.*, USDC N. District of California, Case: 11-cv-01846-LHK, dated Dec. 6, 2011.
Videotaped Deposition of Tony Givargis, Ph.D., pp. 1, 5, 52, 53, 54, 93, 94, 95, 120, in *Apple Inc. v. Samsung Electronics Co. LTD.*, USDC N. District of California, Case: 11-cv-01846-LHK, dated Dec. 6, 2011.
Videotaped Deposition of Tony Givargis, Ph.D., pp. 1, 5, 85, 86, 87, 88, 89, 120, in *Apple Inc. v. Samsung Electronics Co. LTD.*, USDC N. District of California, Case: 11-cv-01846-LHK, dated Dec. 6, 2011.
Apple's Request for Leave to File Statement of Recent Decisions in Support of its Claim Construction Positions, in *Apple Inc. v. Samsung Electronics Co. LTD.*, USDC N. District of California, Case: 11-cv-01846-LHK, dated Jan. 27, 2012.
Declaration of Mia Mazza in Support of Apple's Request for Leave to File Statement of Recent Decisions in Support of its Claim Construction Positions, in *Apple Inc. v. Samsung Electronics Co. LTD.*, USDC N. District of California, Case: 11-cv-01846-LHK, dated Jan. 27, 2012.
Proposed Order Granting Apple's Request for Leave to File Statement of Recent Decisions in Support of its Claim Construction Positions, in *Apple Inc. v. Samsung Electronics Co. LTD.*, USDC N. District of California, Case: 11-cv-01846-LHK, filed Jan. 27, 2012.
Apple's Rebuttal Supplemental Claim Construction Brief, in *Apple Inc. v. Samsung Electronics Co. LTD.*, USDC N. District of California, Case: 11-cv-01846-LHK, dated Jul. 10, 2012.
Declaration of Deok Keun Matthew Ahn in Support of Apple's Rebuttal Supplemental Claim Construction Brief, in *Apple Inc. v. Samsung Electronics Co. LTD.*, USDC N. District of California, Case: 11-cv-01846-LHK, dated Jul. 10, 2012.
Transcript of Proceedings before the Honorable Lucy H. Koh, United States District Judge, in *Apple Inc. v. Samsung Electronics Co. LTD.*, USDC N. District of California, Case: 11-cv-01846-LHK, dated Jun. 21, 2012.
Exhibit 10 "Invalidity Claim Chart for Launchtile Commercially Sold, Publicly Known, or Publicly Used Before Jan. 7, 2007" ("LaunchTile") U.S. Pat. No. 7,469,381.
Excerpts From the Videorecorded Deposition of Ravin Balakrishnan, Ph.D., pp. 1, 6, 186, 265, in *Apple Inc. v. Samsung Electronics Co. LTD.*, USDC N. District of California, Case: 11-cv-01846- LHK, dated Apr. 20, 2012.
Excerpts From the Videotaped Deposition of Ravin Balakrishnan, Ph.D., pp. 5, 151, 152, 153, 154, 155, 156, 157, 158, 337, in *Apple Inc. v. Samsung Electronics Co. LTD.*, USDC N. District of California, Case: 11-cv-01846-LHK, dated Aug. 16, 2011.

(56) References Cited

OTHER PUBLICATIONS

Excerpts From the Videotaped Deposition of Andries Van Dam, pp. 4, 58, 59, 101, in *Apple Inc. v. Samsung Electronics Co. LTD.*, USDC N. District of California, Case: 11-cv-01846-LHK, dated May 2, 2012.
In the Matter of: Certain Portable Electronic Devices and Related Software, Order No. 57: Construing the Terms of the Asserted Claims of the Patents at Issue, dated Jun. 26, 2012.
Apple's Opening Design Patent Claim Construction Brief, in *Apple Inc. v. Samsung Electronics Co. LTD.*, USDC N. District of California, Case: 11-cv-01846-LHK, dated Jun. 12, 2012.
Samsung's Opposition to Apple's Supplemental Claim Construction Brief, in *Apple Inc. v. Samsung Electronics Co. LTD.*, USDC N. District of California, Case: 11-cv-01846-LHK, dated Jul. 10, 2012.
Order Regarding Claim Terms in Jury Notebooks, in *Apple Inc. v. Samsung Electronics Co. LTD.*, USDC N. District of California, Case: 11-cv-01846-LHK, dated Jul. 29, 2012.
U.S. Appl. No. 10/307,403, dated Jul. 1, 2005, Office Action.
U.S. Appl. No. 10/307,403, dated Mar. 21, 2006, Office Action.
U.S. Appl. No. 12/963,444, dated Nov. 2, 2016, Notice of Allowance.
U.S. Appl. No. 13/731,335, dated Mar. 10, 2015, Notice of Allowance.
U.S. Appl. No. 13/731,382, dated Oct. 28, 2016, Notice of Allowance.
U.S. Appl. No. 15/620,912, dated Nov. 16, 2017, Office Action.
U.S. Appl. No. 15/620,912, dated Apr. 26, 2018, Notice of Allowance.
U.S. Appl. No. 13/731,351, dated Apr. 25, 2017, Notice of Allowance.
U.S. Appl. No. 13/371,364, dated Jun. 1, 2017, Office Action.
U.S. Appl. No. 13/730,684, dated Aug. 14, 2017, Notice of Allowance.
U.S. Appl. No. 13/731,364, dated Oct. 13, 2017, Notice of Allowance.

\* cited by examiner

YAHOO! NEWS ❀  News Home - Yahoo! - My Yahoo! - News Alerts - Help  REUTERS◉

[YAHOO! Business Services banner] ⟶ 400

Home Top Stories Business Tech Politics World Local Entertainment Sports Op/Ed Science Health Full Coverage Business - Reuters updated 4:03 PM ET Nov 14                                                      ○ Add to My Yahoo!

Reuters | AP | The New York Times | Motley Fool | The Street.com | ▶Videos | Forbes.com | More...

| Wednesday November 14 1:58 PM ET | | Related Quotes | CASH BACK ON EVERY 1,000 SHARES TRADED |
|---|---|---|---|
| Amazon Up 22 Percent on Retail Data | | S 45.77 +1.09<br>FD 36.97 +2.14<br>GPS 14.97 +0.97<br>TGT 37.49 +1.27<br>AMZN 9.41 +2.12 | |
| Audio/Video | LOS ANGELES (Reuters) - Amazon.com Inc.'s (Nasdaq:AMZN-news) shares rose 22 percent in heavy trade on Wednesday along with other retailers, buoyed by a Commerce Department (news-websites)'s report that total retail sales rose a better than-expected 7.1 percent in October. | | last 0:00 $0 rates apply to other order only may be know for other traders |
| ◁)) UPDATE: Analyst: HD beginning to harness earnings power - (ON24) | | | |
| ◁)) Daily Investment Strategy: FD rides retail sales' coattails - (ON24) | | [  ] (Get Quotes)<br>delayed 20 mins - disclaimer | |
| Analysts said business for both online and traditional retailers appeared to be picking up after shopping virtually ground to a halt following the Sept.11 attacks.<br><br>Amazon stock rose $1.62 to $8.91 on Nasdaq Wednesday afternoon. Analysts also were encouraged by Amazon's recent partnerships with retailers like Target Corp. (NYSE: TGT-news).<br><br>402 ⟶ "Online sales should go up (this holiday season) because people won't be traveling as much. Amazon seems to be doing much better, and I credit it to their recent partnerships," said Geri Spieler, an analyst with GartnerG2. | | ⌨ Full Coverage<br>In-depth coverage about<br>Internet Stocks | BROKERAGE AMERICA™<br>Member of SIPC<br><br>⟵ 408 |
| | | Related News Stories | |
| | | • NetRatings Gobbles Up Rivals - TechWeb/Yahoo! News (Oct 26, 2001)<br>• Jupiter Shoots Up After NetRatings Deal - Reuters (Oct 26, 2001) | |
| News Resurces | | • Inktomi to Offer 12.5 Million Shares - Reuters (Oct 26, 2001) | |
| Message Awards picks Feed bags<br>Conversation start a live disccusion | | | |
| ADVERTISEMENT | | • Homestore.com to Cut Jobs - Los Angeles Times (Oct 26, 2001) | |
| • FREE credit record dail membership<br>• Access four P C form Anywhere free download | | • Overture pulls off Web miracle - Wall St. Journal/MSNBC (Oct 26, 2001) | |
| 404 ⟶ | | More... ⟶ 406 | |
| | | Opinion & Editorials | |
| | | • It Never Rains in eBay Land- Ecommerce Times<br>• Amazon Misplaced Passion?-CBS Market | |

Search News
[                    ] [Search]  Advanced                                           ⟶ 435
Search:   ⦿ Stories   ○ Photos   ○ Audio/Video   ○ Full Coverage Home Top Stories Business Tech Politics World Local Entertainment Sports Op/Ed Science Health Full Coverage Copyright © 2001 Reuters Limited. All rights reserved. Republication or redistribution of Reuters content is expressly prohibited without the prior written consent of Reuters. Reuters shall not be liable for any errors or delays in the content, or for any actions taken in reliance thereon.
Copyright © 2001 Yahoo! Inc. All rights reserved.
Questions or Comments
Privacy Policy - Terms of Service

|⟵————————————————————————————————————————————⟶|
                                                                            ⟵ 410

FIG. 4A

CONSTRAINING DISPLAY MOTION IN DISPLAY NAVIGATION

CROSS-REFERENCE TO RELATED APPLICATIONS

This application is a continuation of U.S. application Ser. No. 13/730,707 filed Dec. 28, 2012, which is a continuation of U.S. application Ser. No. 13/683,828 filed Nov. 21, 2012, which is a continuation of U.S. application Ser. No. 12/963,444 filed on Dec. 8, 2010, which is a continuation of U.S. application Ser. No. 11/617,997 filed on Dec. 29, 2006 and issued as U.S. Pat. No. 7,872,640, which is a continuation of U.S. application Ser. No. 10/307,403 filed on Dec. 2, 2002 and issued as U.S. Pat. No. 7,193,609, which claims the benefit of U.S. Provisional Application Nos. 60/368,988 filed on Apr. 2, 2002; 60/365,160 filed on Mar. 19, 2002; 60/365,161 filed on Mar. 19, 2002; and 60/365,197 filed on Mar. 19, 2002. Each of the aforementioned applications and patents are hereby incorporated by reference in their entirety.

TECHNICAL FIELD

The following description relates generally to a viewing and navigation aid for displaying information on an electronic device having limited display capability.

BACKGROUND

Web pages and other electronic documents generally are formatted for viewing and navigation in display windows of standard-sized or oversized displays, such as, for example, in a display window on a monitor for a desktop computer. The user of the computer can view the entire Web page on one screen display or can easily scroll a short distance to view other portions of the Web page. However, when content is displayed on an electronic device having a display window with smaller dimensions, such as, for example, the display window of a personal digital assistant ("PDA") only a small portion of the Web page is displayed. This may render the document may be difficult to read.

SUMMARY

In one general aspect, navigating on a display includes tracking motion of an input tool on a display, comparing the motion of the input tool to a threshold, changing the position of the visible portion of a page of information on the display if the motion exceeds the threshold, and constraining the position of the visible portion of the page of information on the display if the motion does not exceed the threshold.

Implementations may include one or more of the following features. For example, the input tool may be a pen stylus or a finger, and tracking motion of the input tool may include tracking the pen or finger on the display surface.

The display may include a touch screen and tracking motion of the input tool may include tracking motion of the input tool on the touch screen. The touch screen may include, for example, a resistive sensor, a capacitive sensor, an acoustic wave sensor, or an infrared sensor. The touch screen may include a sensor activated by a touch activation force by the input tool on the display.

The motion may be separated into a horizontal component and a vertical component relative to the display, the horizontal component may be compared to the threshold, and horizontal movement of the visible portion of the page of information on the display may be constrained if the horizontal component does not exceed the threshold. Vertical motion may be left uncompared and unconstrained or comparing the motion also may include comparing the vertical component and constraining the vertical movement of the visible portion of the page of information on the display. Comparing the motion of the input tool to the threshold may include comparing the motion of the input tool to a user-defined threshold or to a system-defined threshold.

The page of information may include columns of information, and constraining the position of the page of information on the display may include constraining the position of the columns of information on the display or constraining the horizontal position of a column of information on the display. The columns of information may include logical columns, and constraining may include constraining the horizontal position of a logical column on the display.

In another general aspect, navigating on a display includes moving a stylus on a display to cause the display to change the viewable portion of the page of information on the display from a first page view to a second page view, tracking the motion of the stylus on the display, comparing a horizontal motion of the stylus on the display to a threshold, maintaining the viewable portion of the page of information at the first page view if the horizontal motion does not exceed the threshold, and positioning the viewable portion of the page of information at the second page view if the horizontal motion exceeds the threshold.

Implementations may include one or more of the features described above.

In another general aspect, navigating on a display includes tracking a motion of a stylus in contact with a display surface of a device that is operable to change a position of a visible portion of a page of information on the display from a first page position to a second page position in response to the motion of the stylus. A horizontal or vertical component of the motion of the stylus on the display surface is compared to a threshold, and the visible portion of the page of information on the display is repositioned to a horizontal or vertical position corresponding to the first page position after the pen stylus is removed from the display surface if the horizontal or vertical component does not exceed the threshold.

Implementations may include one or more of the features described above.

Implementations of the techniques described may include a method or process, an apparatus or system, or computer software on a computer-accessible medium. The techniques may be used in conjunction with devices such as, for example, PDAs, telephones, including wireless and web phones, handheld computers, monitors, games, and electronic books. The details of one or more implementations are set forth in the accompanying drawings and the description below. Other features will be apparent from the description, the drawings, and the claims.

DESCRIPTION OF DRAWINGS

FIG. 2 illustrates a display window superimposed onto a page.

FIGS. 4A and 4B illustrate reformatting of a page.

Like reference symbols in the various drawings indicate like elements.

DETAILED DESCRIPTION

Pages coded according to hypertext markup language ("HTML") are designed for display in display windows of different sizes. On smaller displays, a width of a display window often corresponds to a width of a display minus a width of a window frame and a width of a vertical scroll bar, and may be constrained to be no larger. On larger displays, the width of a display window may constitute a smaller portion of the entire width of the display. In some cases, a display window may constitute the entirety of the display (i.e., there may be no window frame or scroll bar). In other cases, the display window may be purposefully sized to be substantially smaller than the overall size of the display. For example, a user of a desktop system with a large display may open a small display window to view a particular page.

Figure 1A:
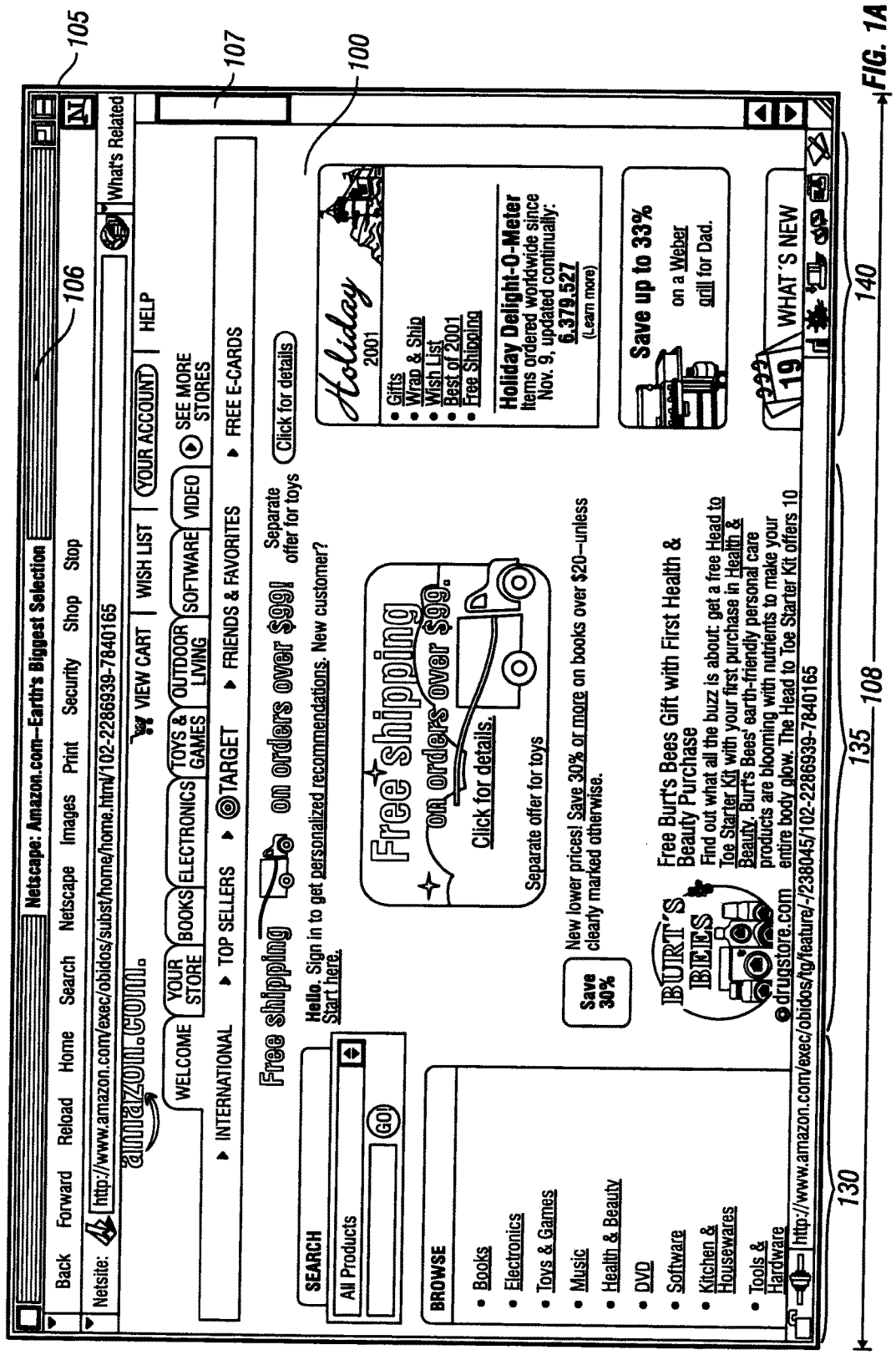
FIGS. 1A-1D are screen shots of a page on display windows of varying dimensions.

Typically, a page expands or shrinks to match the width of the display window. FIG. 1A illustrates a page 100 in a wide display window 105 having a window frame 106 and a scroll bar 107. The display window 105 may be, for example, the window that would be displayed on the monitor of a desktop computer. As shown, the page 100 expands to fit the window width 108.

Figure 1B:
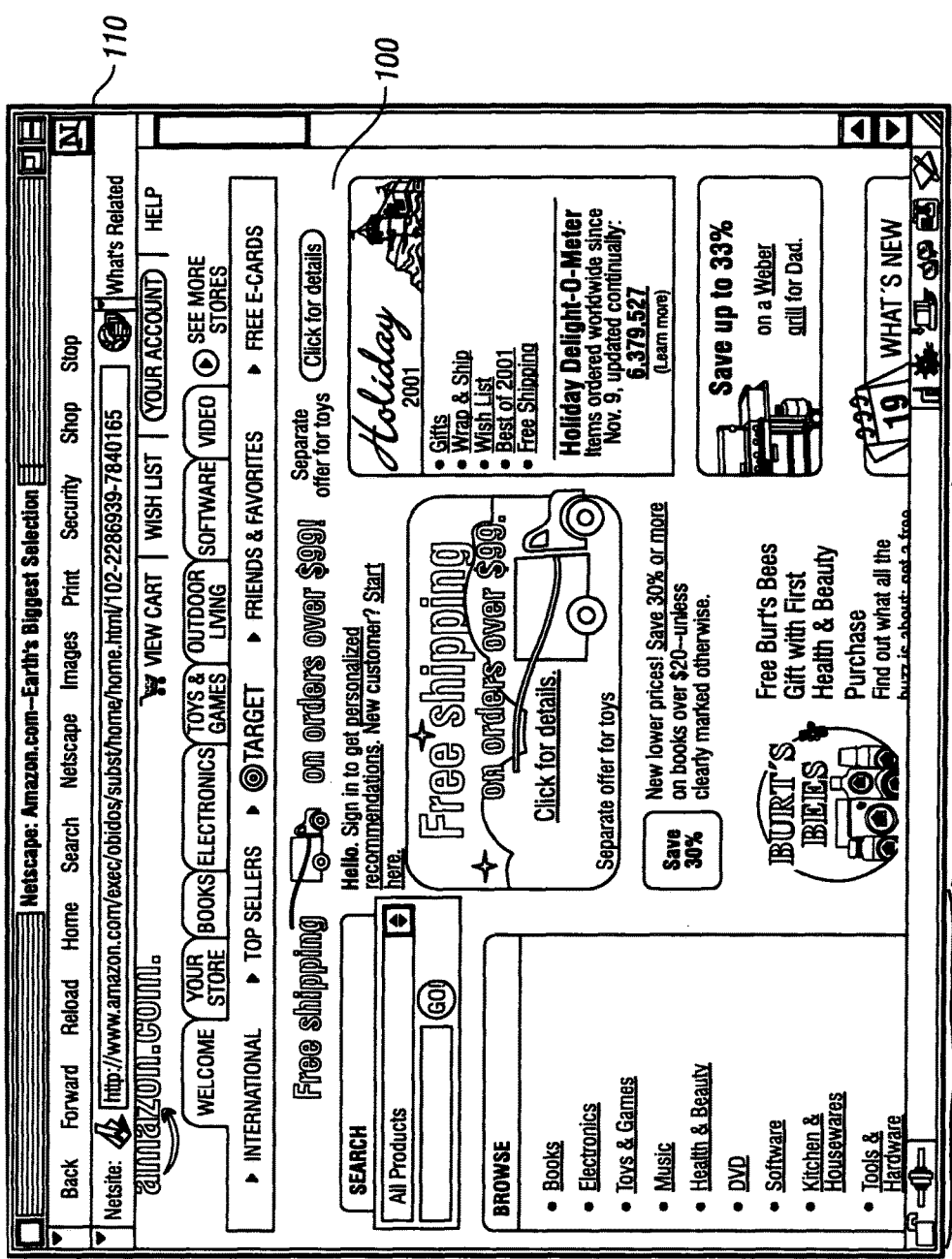

FIG. 1B shows the page 100 on a device having a smaller display window 110. As shown, the page width is reduced to fit the width of the display window 110 by reducing the width of columns 115, 120 and 125 presented in the display window 100 relative to the width of corresponding columns 130, 135 and 140 in the display window 105. In particular, the center column 120 in the display window 110 is substantially narrower than the corresponding center column 135 in the display window 105.

Figure 1C:
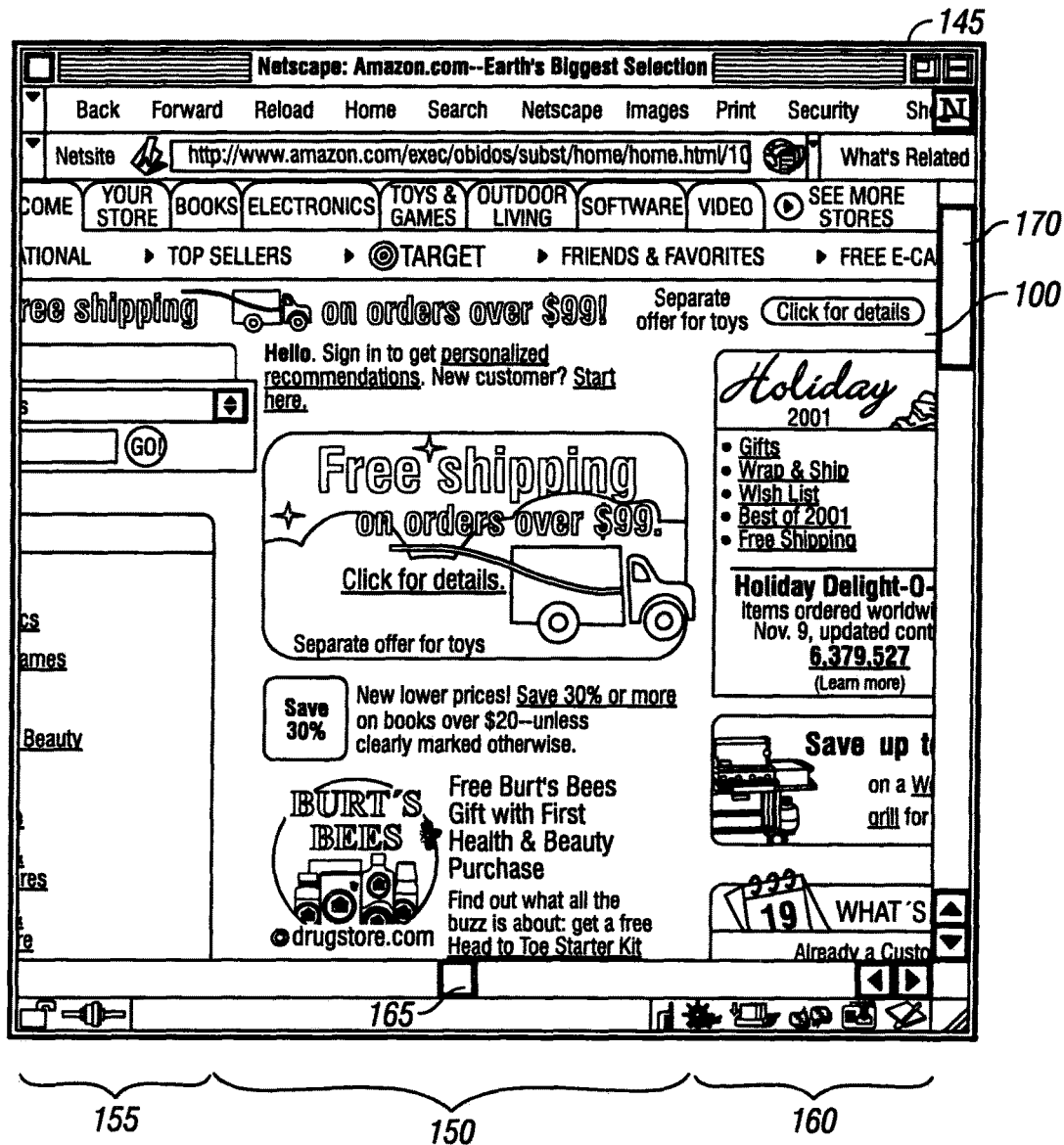

The width of the columns may only be reduced until a minimum width for the page is reached. FIG. 1C shows the page 100 in a display window 145 that is narrower than the established minimum width of the page 100 such that the page 100 exceeds the bounds of the display window 145 and only a portion of the page 100 is displayed by display window 145. As shown, the entire width of the center column 150 is displayed, while only portions of the left column 155 and the right column 160 are displayed. The display window 145 also includes a horizontal scroll bar 165 and a vertical scroll bar 170 for use in selecting and viewing the columns and the portions thereof that are displayed.

Figure 1D:
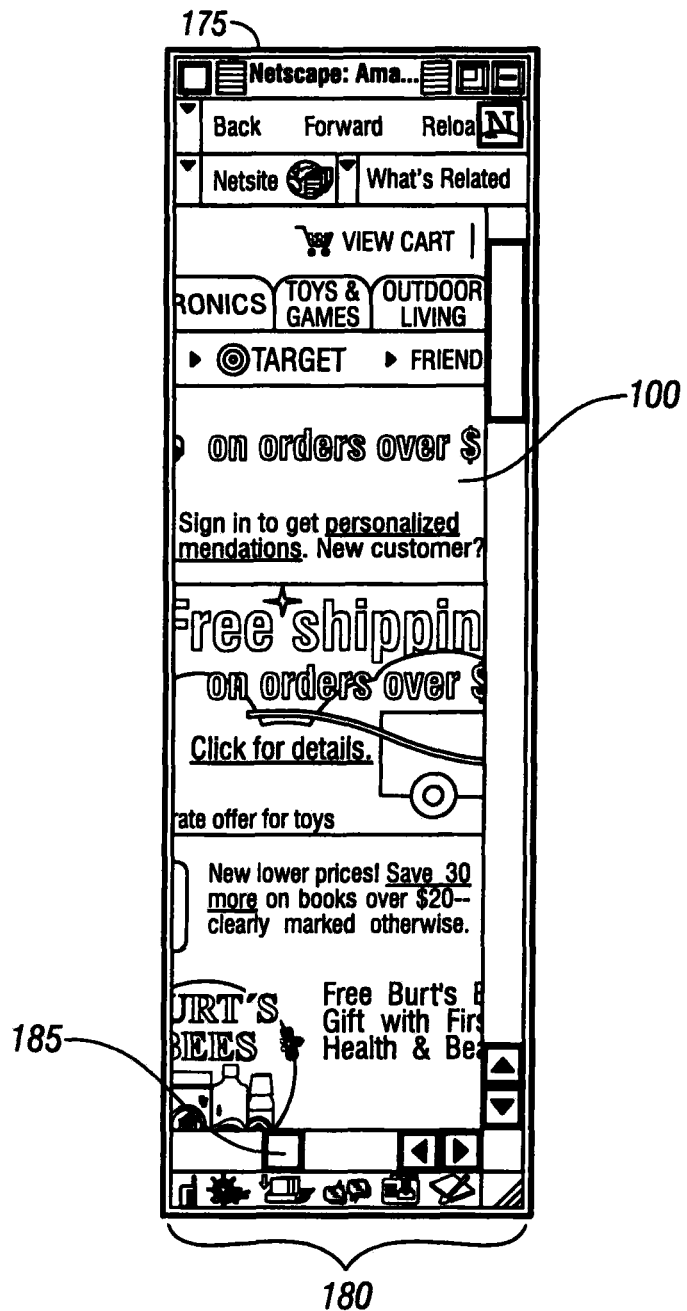

In some cases, the display window is narrower than the width of a single column. For example, FIG. 1D shows the page 100 in a display window 175 of a portable electronic device, such as, for example, an Internet-enabled cellular telephone. As shown, only a portion of a single column 180 is displayed. As a result, the user must scroll back and forth horizontally, using, for example, a scroll bar 185, to read each line of text.

Figure 2:
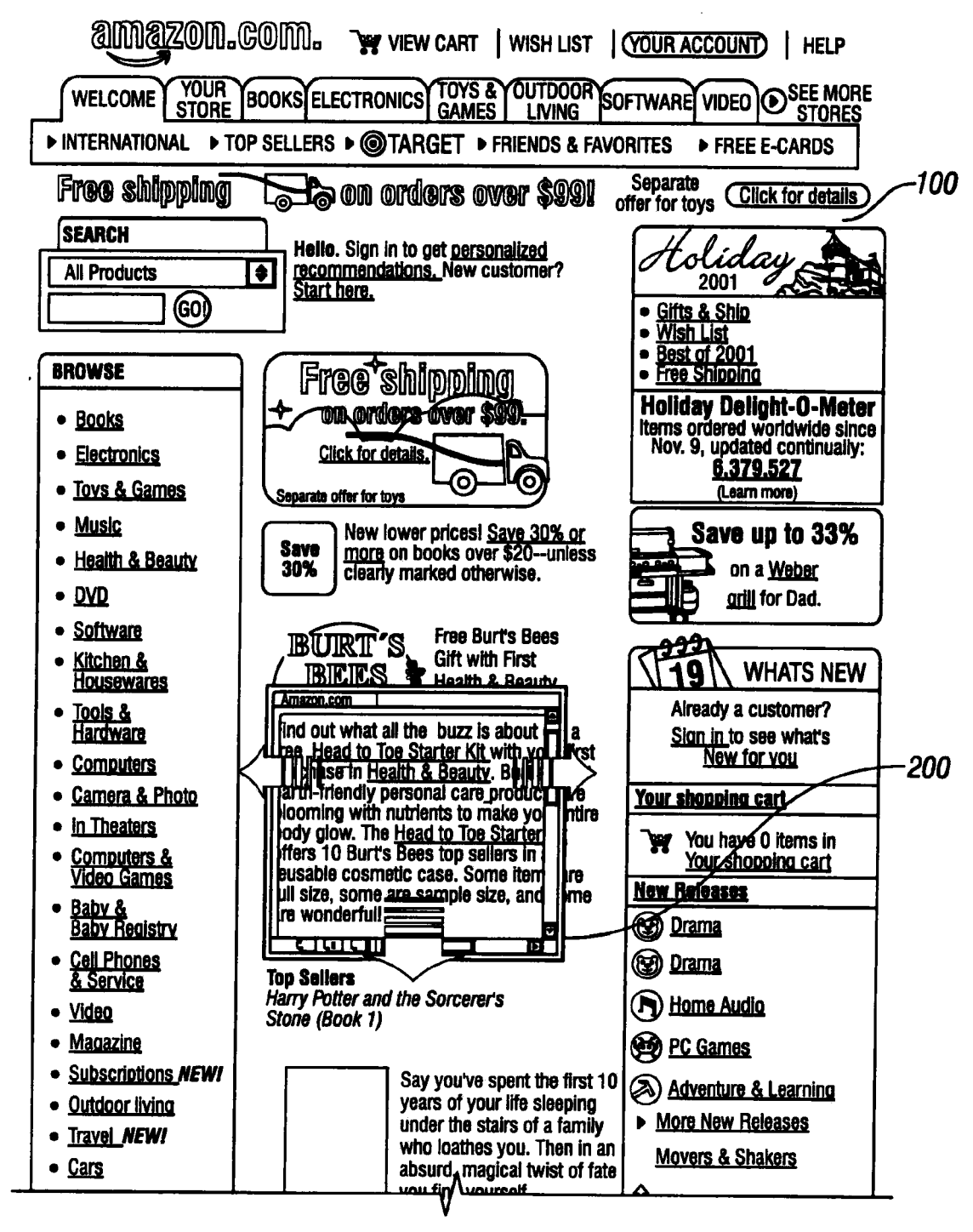

FIG. 2 illustrates a display window 200 superimposed onto the page 100. The display window 200 is representative of the display of, for example, a PDA. Since the page and column are each larger than the display window 200, the user must scroll back and forth to read each line of text. PDA browsers may use various reformatting methods to enhance the readability of the page. Reformatting may include scaling down images, text size, and other page components.

Figure 3:
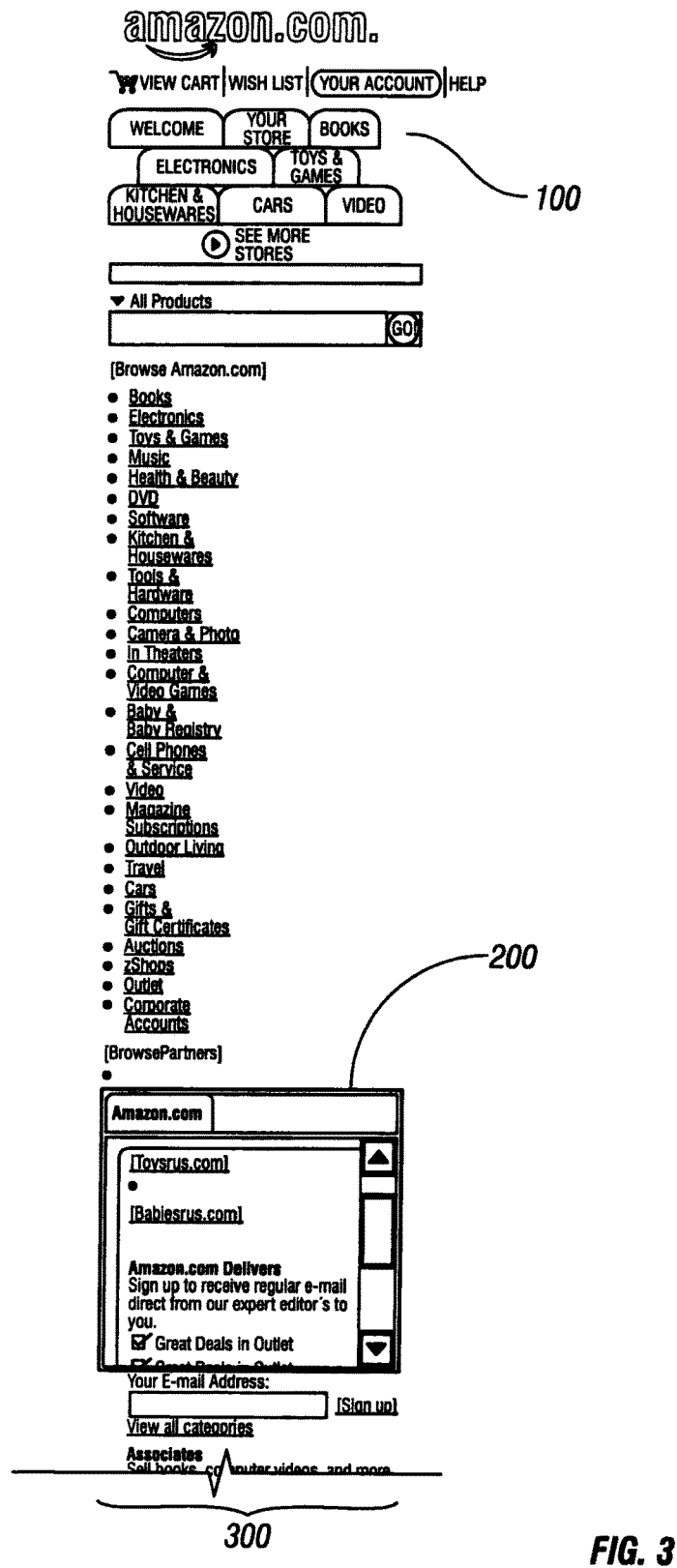
FIG. 3 illustrates a display window superimposed onto a column of information from a page.

FIG. 3 shows the page 100 reformatted as a single column 300. In particular, the columns of the page 100 are stacked to form the single column 300, the width of the column 300 is limited to the width of the display window 200, and word wrapping is used to provide continuity/readability. The display window 200 stays centered on the column as the user scrolls down the page to read the text.

Figure 4B:
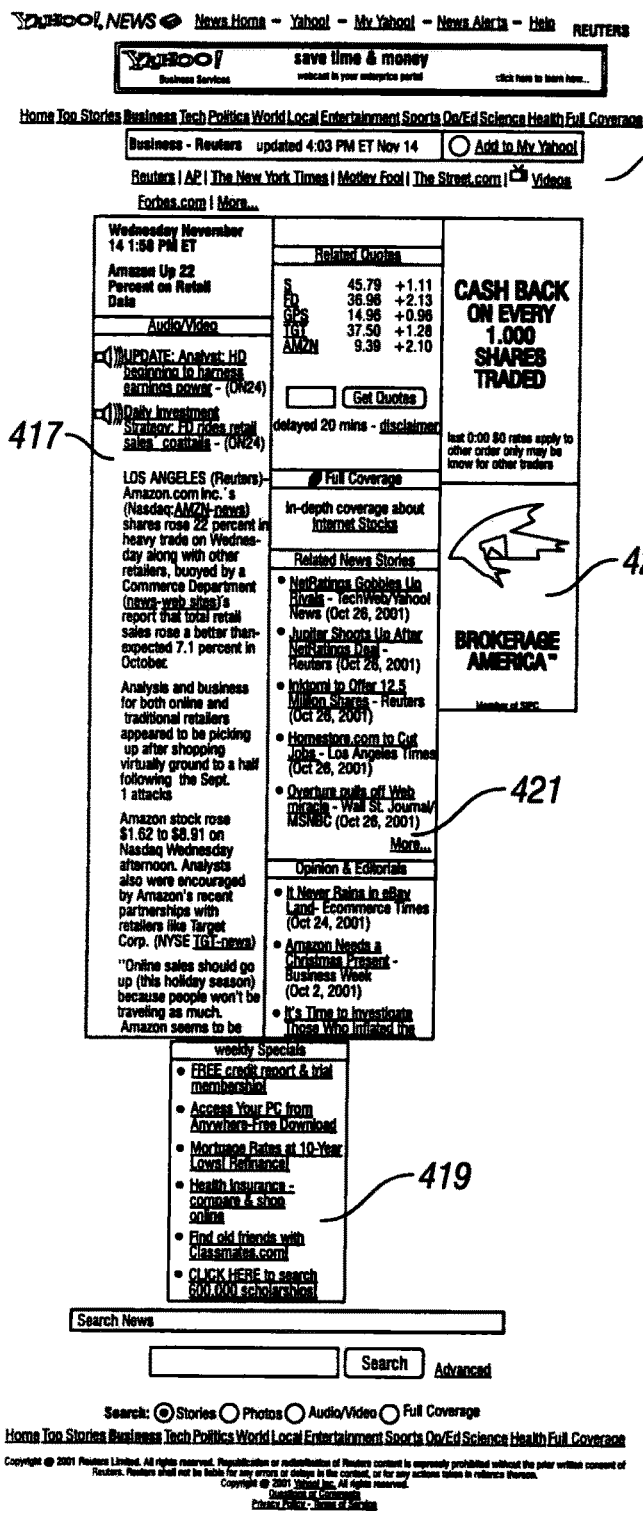

FIGS. 4A and 4B show that a page 400 (FIG. 4A) having elements 402, 404, 406 and 408 of differing widths and sized to fit a wide window width 410 may be reformatted as a page 415 (FIG. 4B) having elements 417, 419, 421 and 423 with widths corresponding to the width 425 of a narrow display (e.g., a PDA display). The elements 417, 419, 421 and 423 are readable columns of information that each fit within the width 425 of the display window or can be reduced to a width that does not exceed the width of the display window 425. The elements 417, 419, 421 and 423 are aligned to correspond with the topology of the page 400. Thus, even though the page 415 exceeds the viewing boundaries of the display window, the user can view various portions of the page 415 with a better sense of the orientation of the content on the page 415 and can navigate on the page 415 more easily. Each column of text can be read without requiring the user to scroll back and forth horizontally. Instead, the user scrolls down as if reading a newspaper column.

Reformatting a page requires identification of the page topology from the page format coding. As shown in FIG. 4, a common HTML page topology includes a header 430 with no logical columns, a body including one or more logical column elements 402, 404, 406 and 408, and a colophon 435 with no logical columns. Other variations of this topology include a header, a first body having N columns, another header, a second body having M columns, with M being the same as or different from N, and a colophon; a header, multiple bodies, and a colophon; a header, a body, and no colophon; no header, a body, and no colophon; or a header, no body, and no colophon.

The topologies described above have some common features. For example, the headers usually do not contain long paragraphs of text. Thus, headers seldom need to be reformatted for the display window of the PDA viewing device. In the event that the header is wider than the display window, navigation through the header is not difficult for the user. Similarly, the colophon usually does not contain long paragraphs of text and may be easily navigated. Typically, the body or bodies are laid out in one or more columns. The columns can be constrained to the window width to enhance readability, as described with respect to FIGS. 3, 4A and 4B. Based on these topologies, most HTML pages are readily reformatted into constrained sets of logical columns, with no column exceeding the display width.

Figure 5:
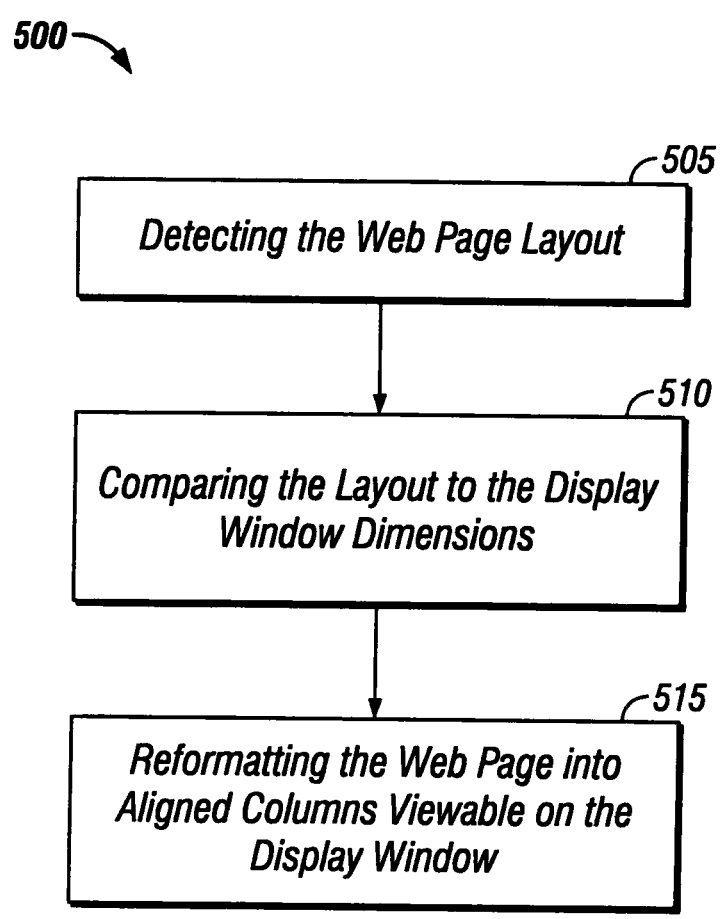
FIG. 5 is a flow chart of a method of reformatting a page.

Referring to FIG. 5, a process 500 for enabling viewing of a page on a display includes detecting the page layout (step 505), comparing the layout to the dimensions of the display window (step 510), and reformatting the page into aligned columns that are viewable on the display (step 515). In one implementation, the page layout is detected (step 505) by separating the layout of the page into components and then analyzing those components. The page coding may be identified to recognize formatting codes. For example, HTML code includes identifiable header, body, or table tags. Once the HTML tags are identified, the page may be recoded in a language other than HTML for easier viewing on the small display window.

The width of each logical column is less than or equal to the display window width. The logical columns may be produced by comparing the width of each column of the page to a width of the display window and establishing a new column width that does not exceed the display window width. Typically, the new column width is smaller than the original column width. However, in some implementations, a column that is narrower than the display window width may be widened to have a new width that does not exceed the display window width. The logical columns then are aligned for viewing on the display.

When the display is part of a client of a client/host architecture, the host may be notified of the display window size from information residing at the client or residing at the client. For example, the host may be notified upon establishment of a connection between the client and the host, at time intervals after establishing the connection between the client and the host, or after any change in the display window size. The host then may reformat the page based on the display window size prior to delivery to the client. Alternatively, the client may perform the reformatting.

Typically, PDA navigation is performed by using scroll bars to move on or between pages of information on the display.

Figure 6:
FIG. 6 illustrates a display window and pen stylus superimposed onto a page.

Referring to FIG. 6, another common PDA navigation feature is the capability to scroll the display window by placing a stylus 600 on the display window 605 and then dragging the stylus 600. However, such "touch-and-drag" scrolling can result in information 610 that is positioned in the display window 605 but is difficult to view or read since the user may inadvertently navigate to a position where only a portion of a column or an image is visible in the PDA display window 605.

Figure 7:
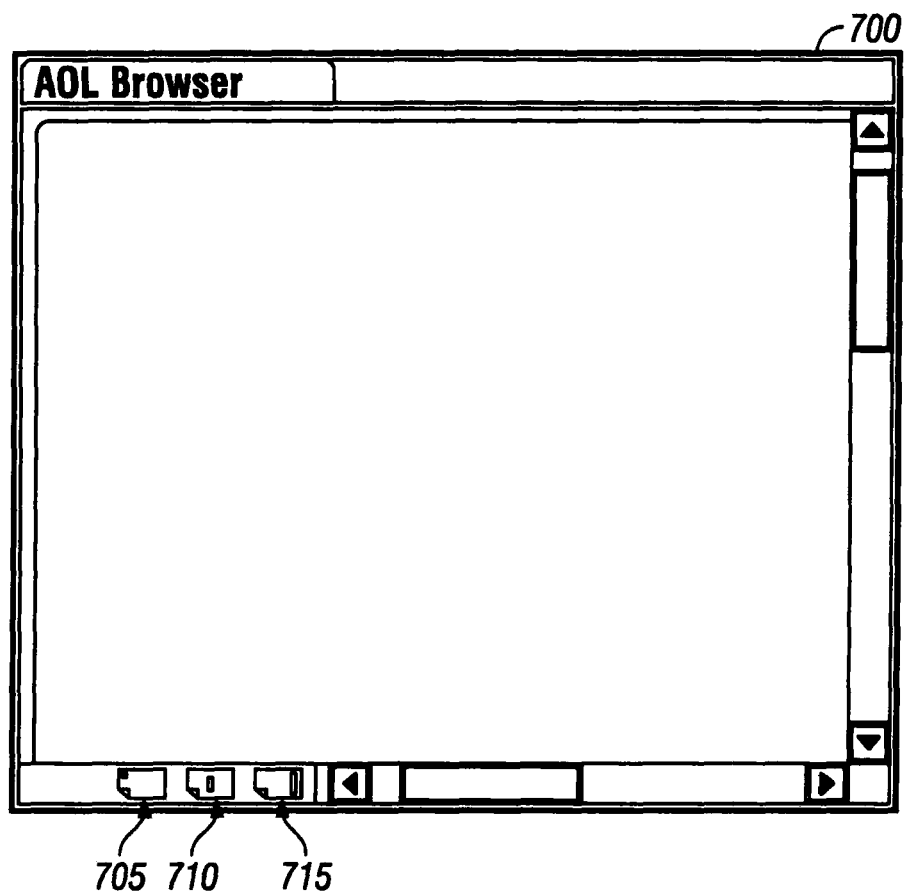
FIG. 7 illustrates a display window with navigation buttons.
Figure 8A:
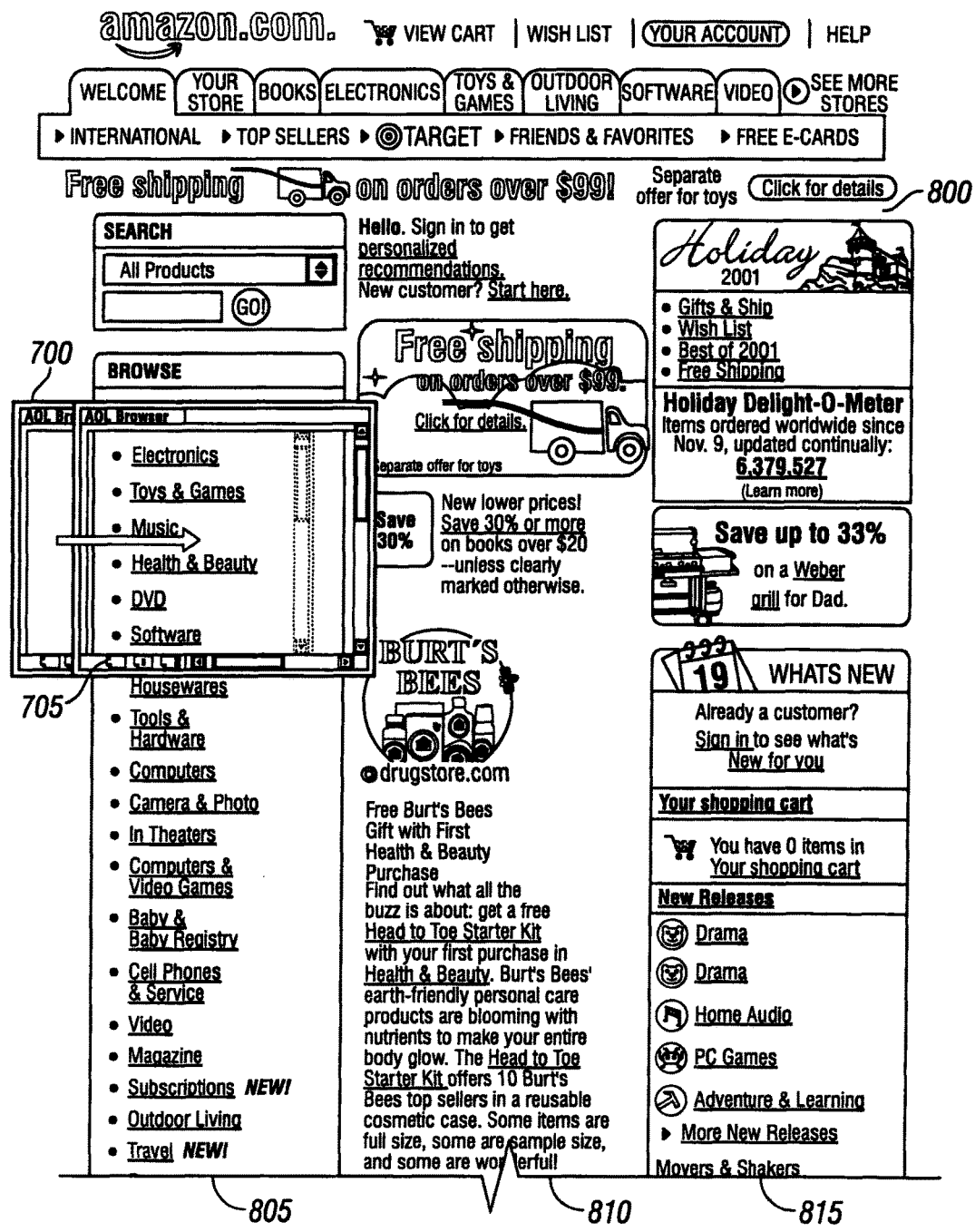
FIGS. 8A-8C illustrate display windows superimposed onto a page.
Figure 8B:
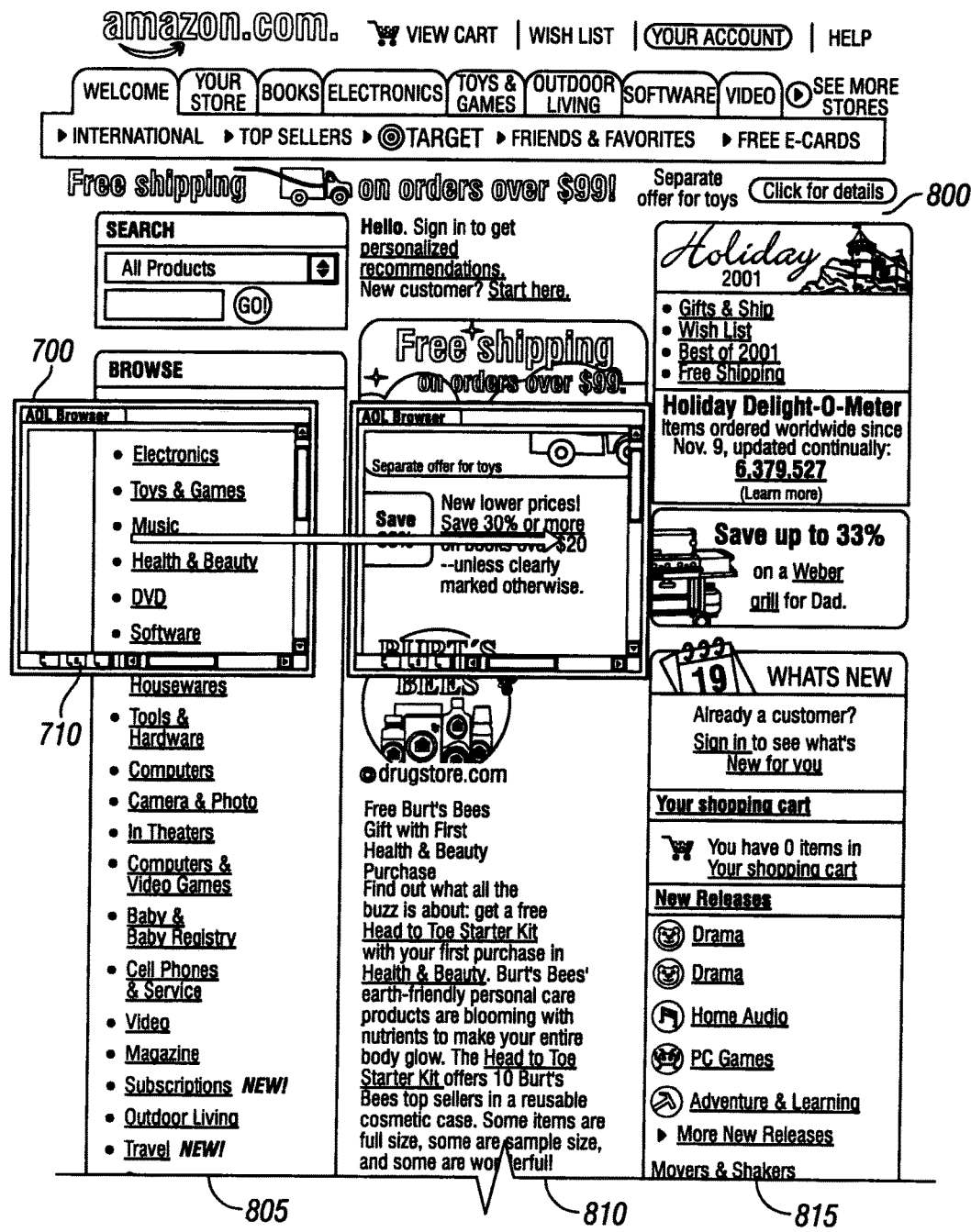
Figure 8C:
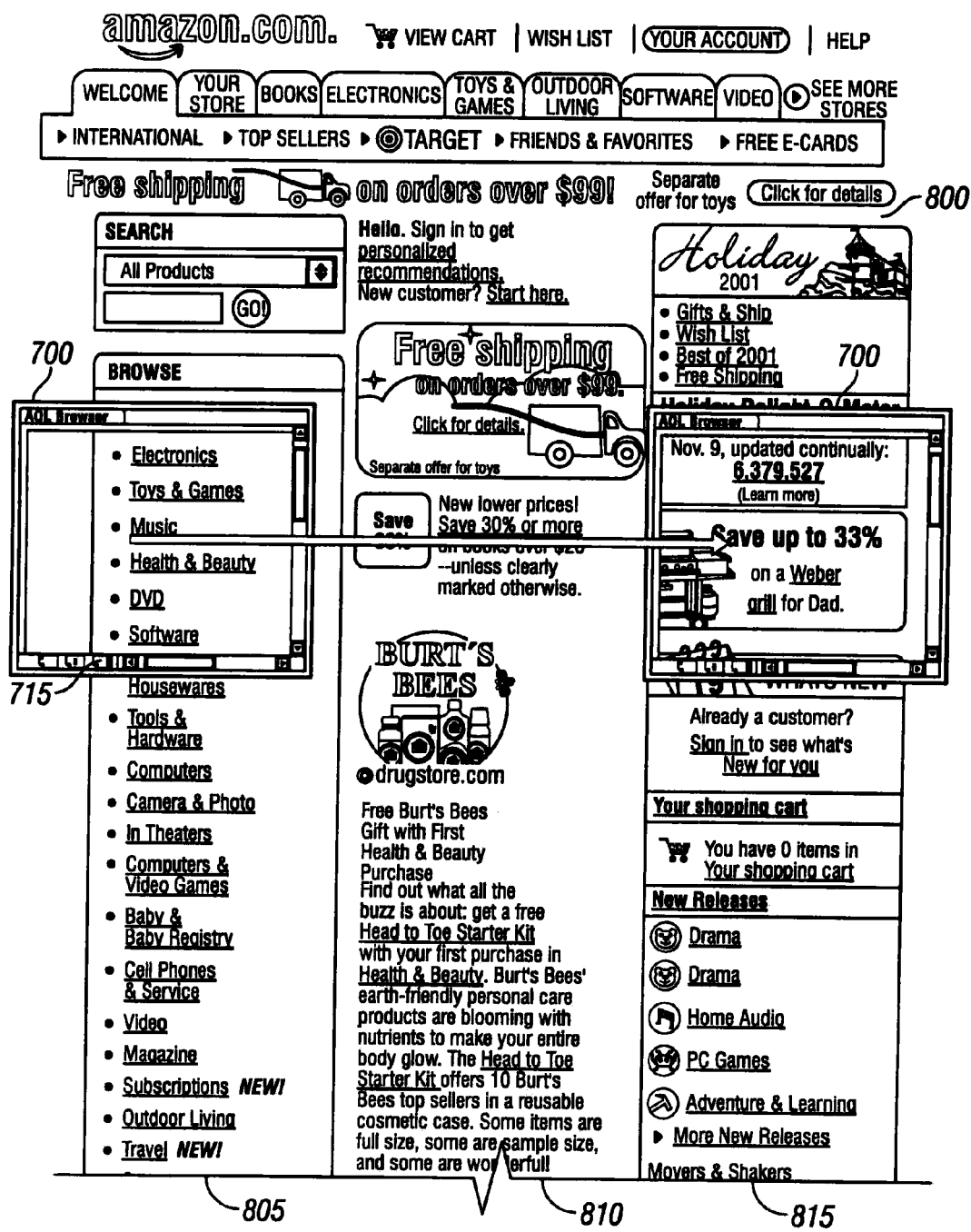

Referring to FIG. 7, to aid user navigation to view a desired text column, a display window 700 includes small icons 705, 710, and 715 that represent navigation buttons. Each of navigation buttons 705, 710 and 715 represents a logical column of the page currently being viewed. The navigation buttons 705, 710 and 715 provide the user with a graphical representation of the number of logical columns 700 available on the page. In other implementations, the navigation buttons correspond to columns of predetermined absolute or relative position within the page (e.g., leftmost column, rightmost column, left adjacent column, right adjacent column or center column). Each button also is used to properly position the display window 700 on the corresponding column of text when the user selects the icon. For example, referring to the tri-column display of FIG. 8A, when the user selects the left-most navigation button 705, the window 700 is positioned on the left-most or first logical column 805 of a page 800. Referring to FIG. 8B, when the user selects the central navigation button 710, the window 700 is positioned on the second logical column 810 of the page 800. Referring to FIG. 8C, when the user selects the right-most navigation button 715, the window 700 is positioned on the third or right logical column 815 of the page 800.

The number of navigation buttons can vary according to the number of logical columns. For example, if a page displayed in the window 700 has just one column, then the display includes one column navigation icon. If the page being displayed has two columns, then the display includes two column navigation icons. Depending upon the display limitations of the window, any number of icons can be displayed to correspond with the number of columns. When the element displayed in the window is one that has no logical column, such as, for example, a header or a colophon, the icons for the following or preceding logical columns may be displayed depending on the user's preference.

Figure 9:
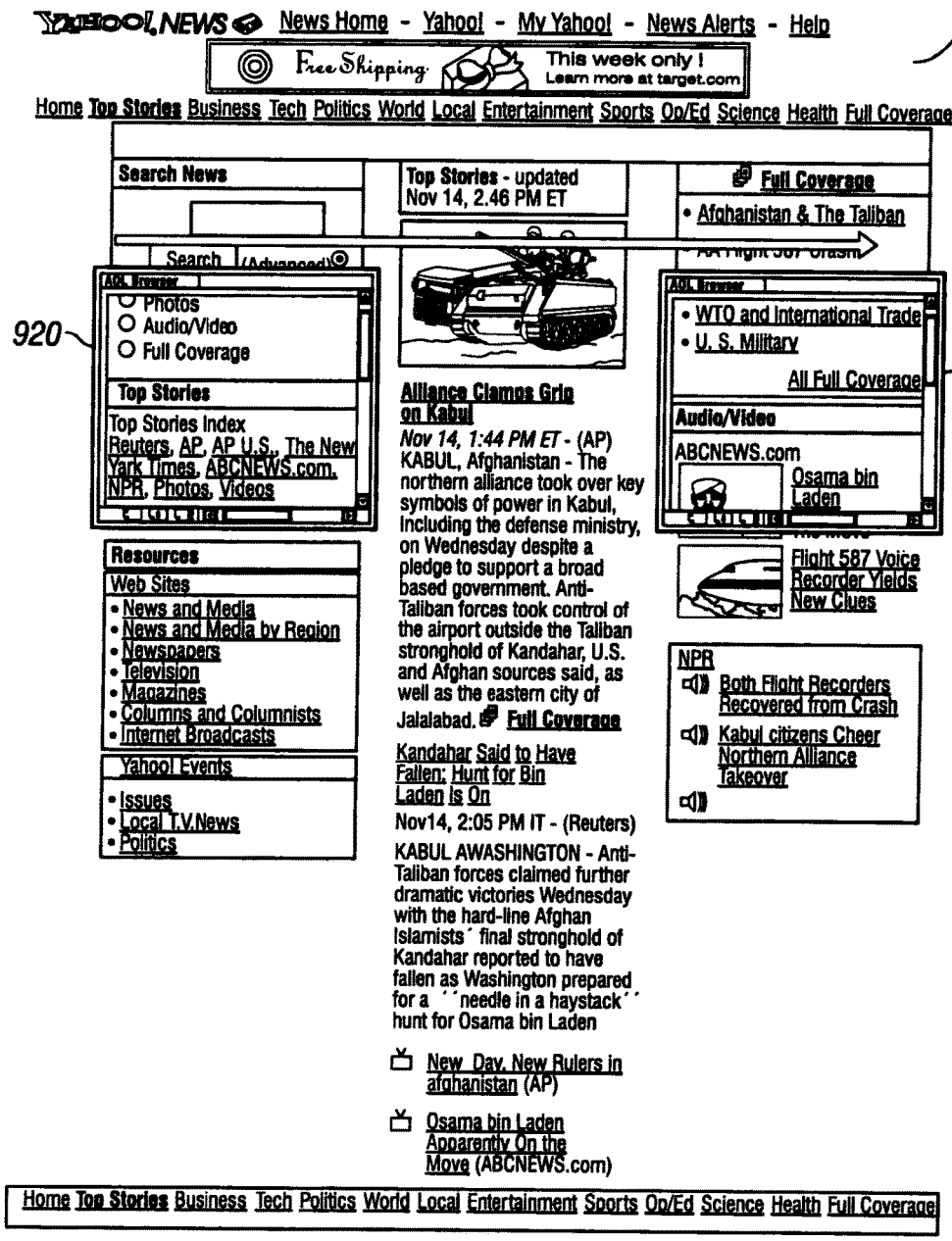
FIGS. 9 and 10 each illustrate a display window superimposed onto a page.

As the number of logical columns increases, the user has more options for jumping discretely between columns. This can cause the user to become disoriented concerning the position of the page relative to the display window, which may result in the user selecting an incorrect scrolling direction to view other parts of the page. For example, referring to FIG. 9, the user may begin viewing a page 900 by selecting a first column 905 of columns 905, 910 and 915 for display in the window 920. The user then may decide to jump to the third text column 915 to view the information in that column. Subsequently, the user may decide to return to the previously viewed first column 905. However, since the appearance of the display window 920 changed instantaneously when the used jumped discretely between the text columns 905 and 915, the user may not recall the position of the previously-viewed text column relative to the currently-displayed column.

Figure 10:
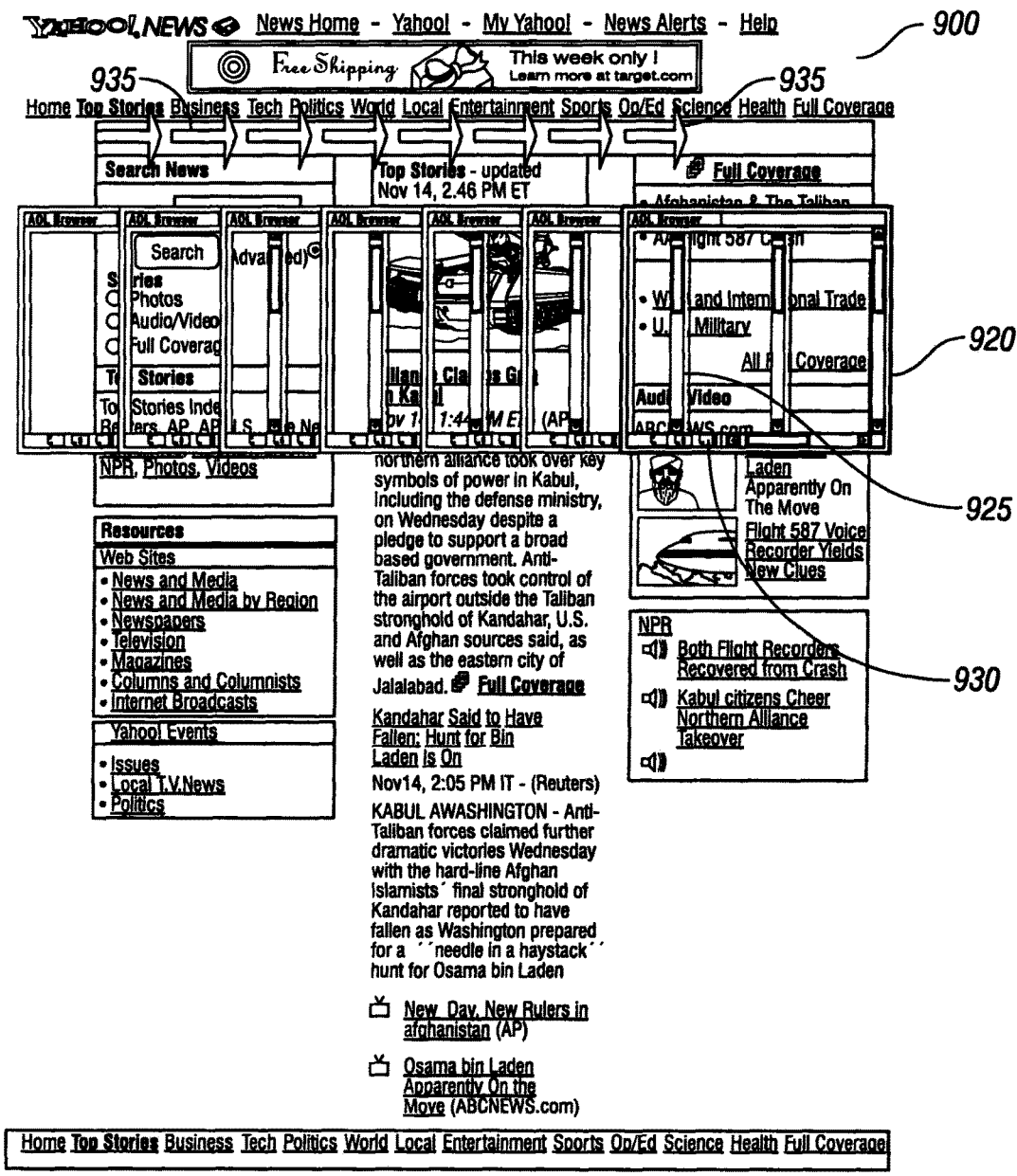

Referring to FIG. 10, as the user navigates to various positions on the page 900, animation effects 925 are provided to give the user a better sense of direction and position. The animation effects add a sense of motion to the content being displayed. For example, in one implementation, when the user actuates a navigation button 930 to move to a new location on the page 900, the user sees the page 900 slowly scrolling across the display window, as represented by the series of arrows 935 in FIG. 10, until the new location is centered on the display window 920. Animation also may be provided in response to a stylus or finger used on a display window with a touchscreen. The touchscreen may include, for example, a resistive sensor, a capacitive sensor, an acoustic wave sensor, or an infrared sensor.

Figure 11:
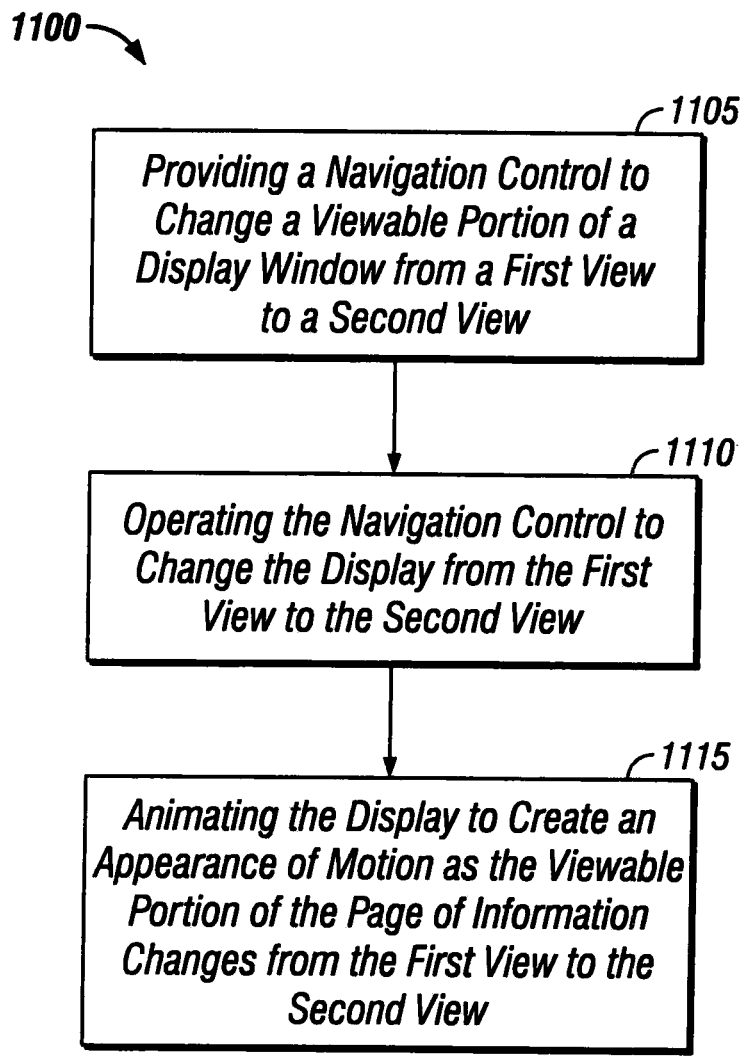
FIG. 11 is a flow chart of a method of navigating on a display window.

Referring to FIG. 11, a procedure 1100 for supporting navigation on a display includes providing a navigation control operable to change a viewable portion of a page of information on a display from a first view to a second view (step 1105), permitting operation of the navigation control to change the display from the first view to the second view (step 1110), and animating the display to create an appearance of motion as the viewable portion of the page of information changes from the first view to the second view (step 1115). Operation of the navigation control may include operation of a device such as a mouse or trackball, use of a stylus, or use of a voice command.

Animation on the display may include one or more animation effect. For example, animating the display (step 1115) may include slowly scrolling or shifting the display content to give the display an appearance of slow motion. In another implementation, animating the display (step 1115) includes illustrating a visible portion of the page of information moving continuously on the display from the first view to the second view. In a further implementation, animating the display (step 1115) includes drawing a line from the first view to the second view. In still a further implementation, animation (step 1115) includes displaying a reference marker moving from the first view to the second view. This may be done, for example, using a separate window or portion of the display. In one implementation, the user selects a velocity at which to change the viewable portion of the page from the first view to the second view. In another implementation, the user selects an acceleration at which to change the viewable portion of the page of information from the first view to the second view. The user also may select a constant or variable velocity or acceleration. For example, the user may select a variable velocity that begins scrolling the display slowly, picks up speed, and then slows down again as the displayed portion approaches the second view.

Figure 12:
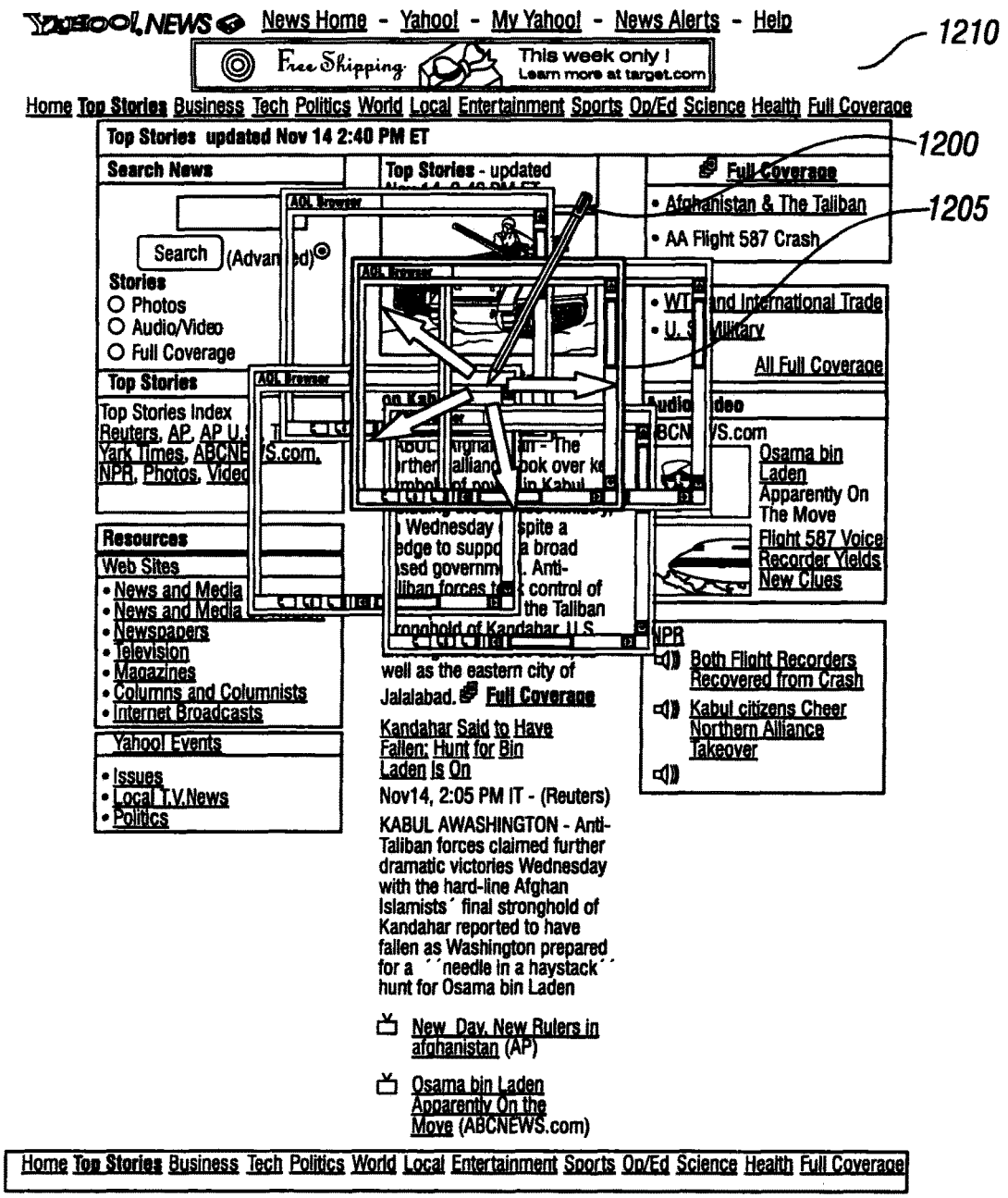
FIGS. 12, 13, 14A and 14B each illustrate a display window superimposed onto a page.
Figure 13:
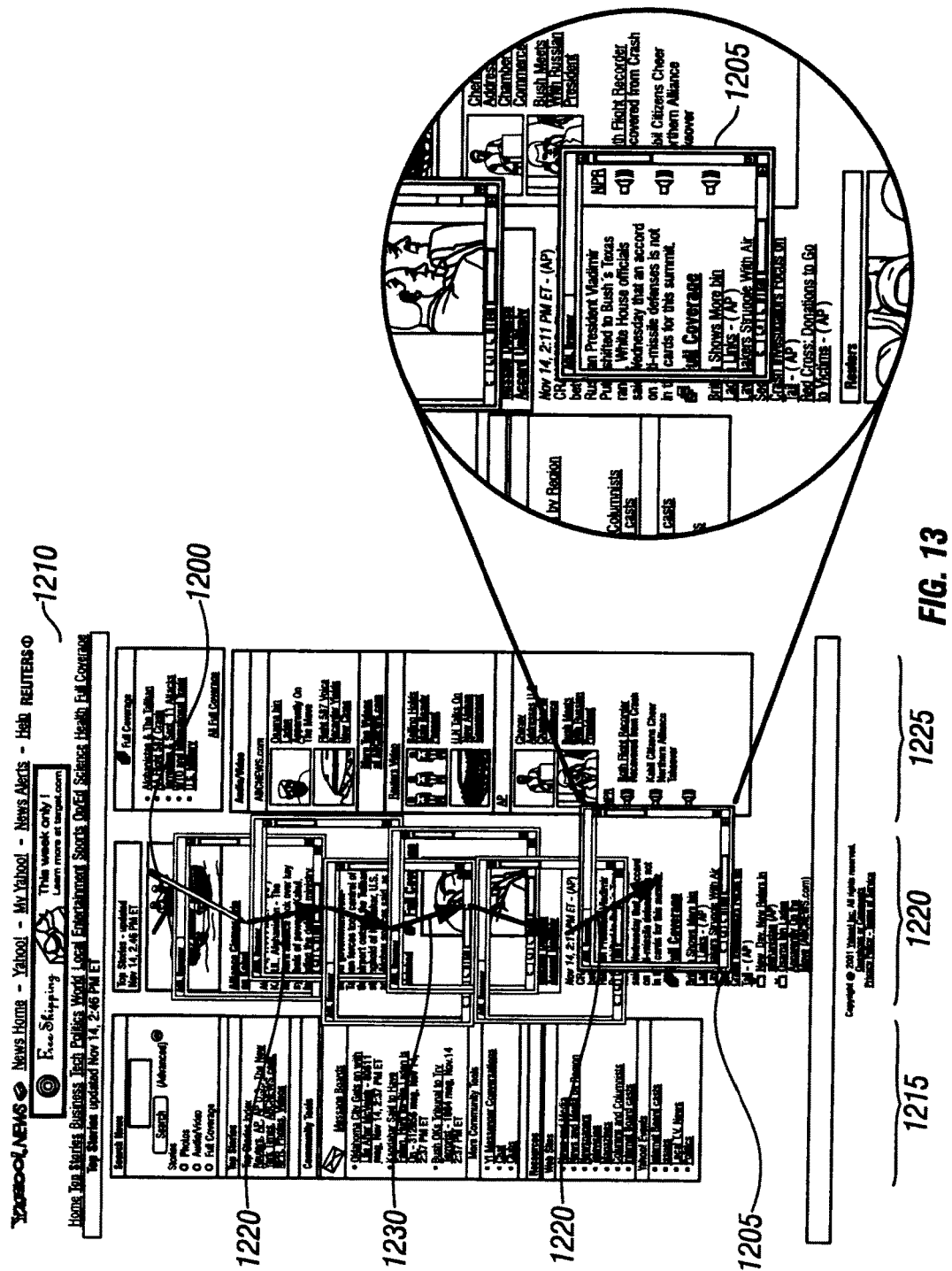

Referring to FIG. 12, on a stylus-based PDA, the user can use a stylus 1200 to scroll a display window 1205 vertically down a page 1210 in order to read a column 1215, 1220 or 1225 of text of the page 1205. However, referring to FIG. 13, vertical touch-and-drag scrolling has a drawback in that slight horizontal motion or "wobbling" of the pen 1200, as represented by the series of arrows 1230, can cause the text column 1125, 1220, or 1225 to become misaligned on the display 1205, resulting in a misalignment between the column 1215, 1220, or 1225 and the display window 1205. To correct for this and to view a desired one of the columns 1215, 1220, or 1225 in one view, the user manually centers the desired column in the display window 1205 by making one or more left or right corrections to the stylus 1200.

Figure 14A:
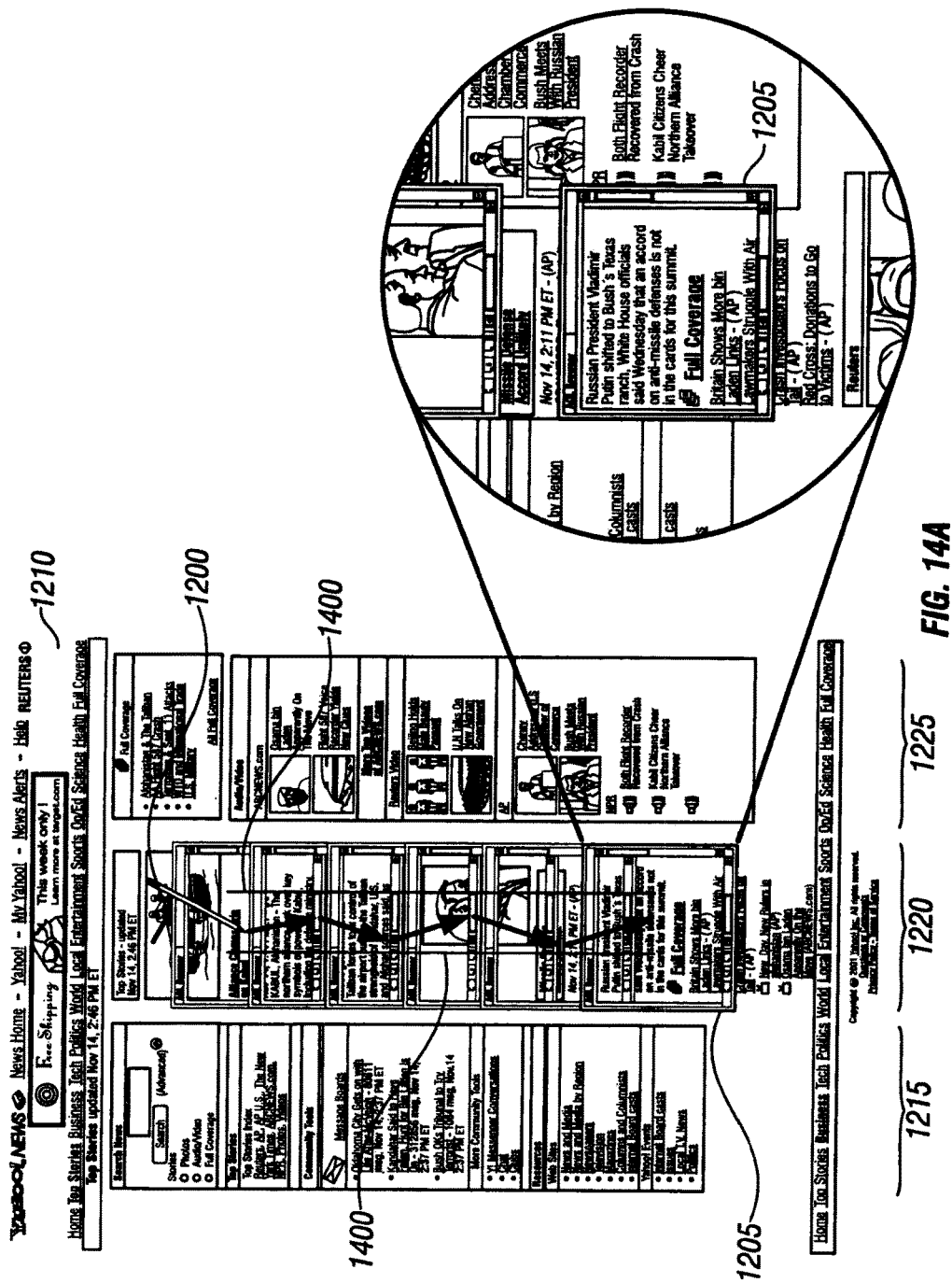

Referring to FIG. 14A, a vertical alignment control, as represented by the vertical bars 1400, can minimize wobble of the display 1205 during vertical scrolling with the pen 1200. As the user scrolls the page up or down with the stylus 1200, the vertical alignment control ignores slight horizontal motion such that the text column 1220 remains aligned in the display window 1205. This is based on the assumption that, when the window 1205 is positioned over a logical column 1220 and the user drags the pen up or down without significant horizontal motion, the intention of the user is to view only the logical column 1220. Based on this assumption, the alignment control constrains screen scrolling to the vertical direction as long as the stylus stays between the bars 1400.

The user can define the sensitivity of the vertical alignment control. For example, the user may specify a horizontal motion threshold (i.e., the spacing between the bars 1400). If the threshold is not exceeded, any horizontal motion by the pen 1200 on the screen is ignored. If the threshold is exceeded, the displayed text moves left or right accordingly. In one implementation, the user can adjust the sensitivity of the horizontal motion by establishing a threshold for a parametric number of pixels. The two vertical bars 1400 represent the threshold of horizontal motion, measured as the parametric amount of pixels, which must be exceeded to scroll the display window 1205 left or right. The vertical alignment controls may be enabled or disabled by the user.

Figure 14B:
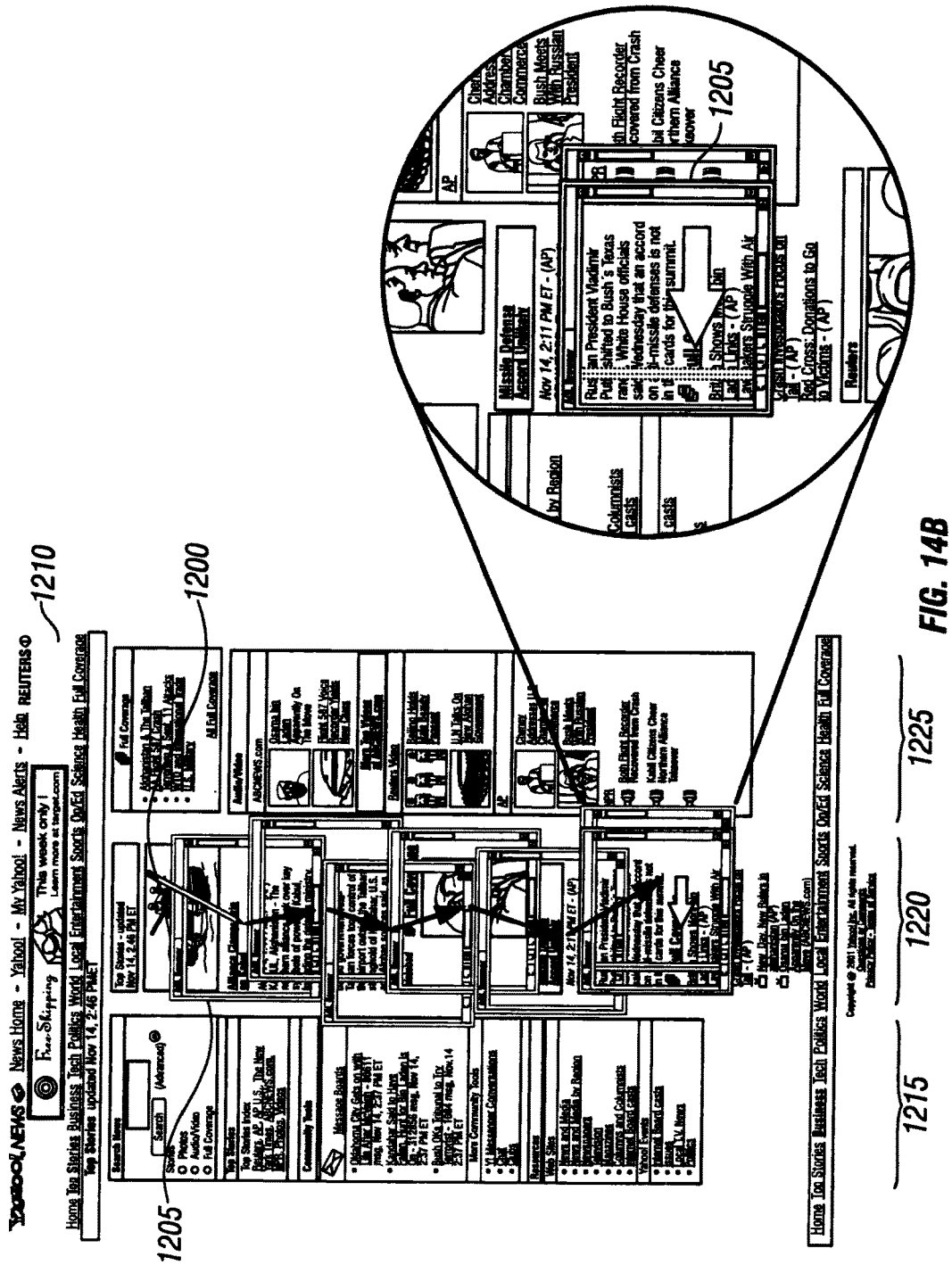

Referring to FIG. 14B, in another implementation, the vertical alignment control is enabled when the user lifts the pen 1200 from the display 1205. This causes the logical column 1220 to snap into alignment with the display window 1205 as the user stops scrolling. The user can adjust the snap sensitivity by, for example, setting the alignment control to snap to the nearest logical column based on a user-defined snap threshold. If the user's scrolling does not exceed the threshold, which indicates an intention to continue to view the text column 1220, the display 1205 centers the logical column 1210 as the pen 1200 is lifted from the screen. If the user's scrolling exceeds the threshold, which indicates an intention to move beyond the boundary of the logical column 1220, the display is snapped to the adjacent or repositioned column. In other implementations, no snapping occurs when the user's scrolling exceeds the threshold. The snap-on-column feature can also be animated to provide an appearance of movement as the display scrolls to the correct column-viewing position.

A similar horizontal alignment control also may be provided. Such a control may be used to limit vertical movement when scrolling horizontally in, for example, a spreadsheet application.

Figure 15:
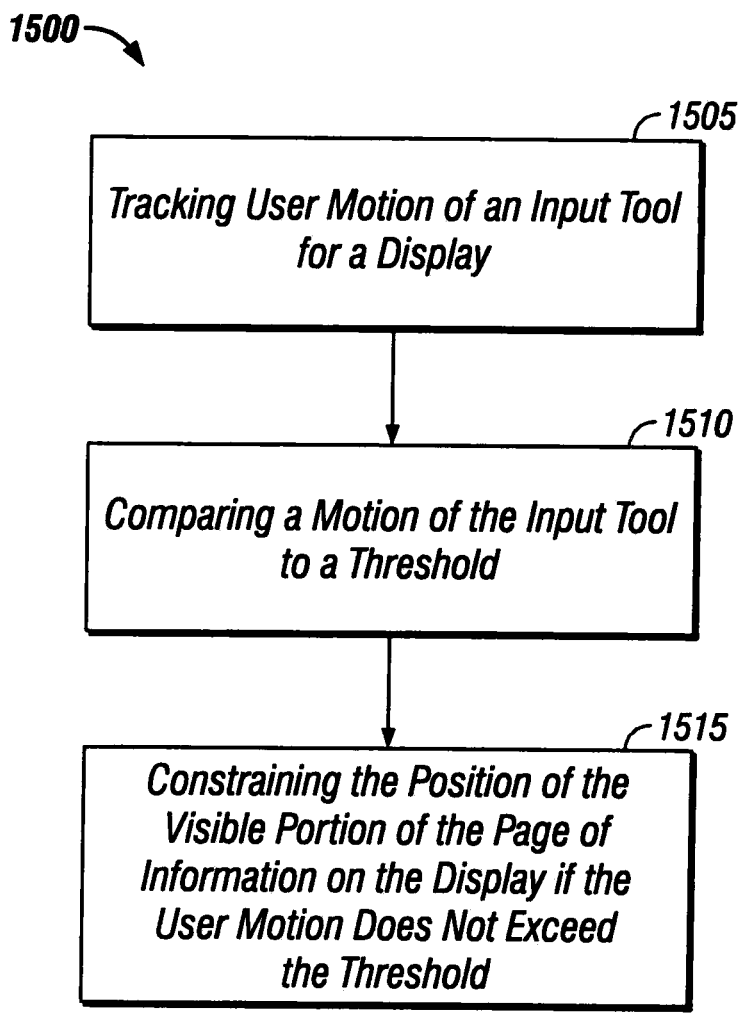
FIG. 15 is a flow chart of a method of constraining the scrolling of information on a display window.

Referring to FIG. 15, a procedure 1500 for supporting navigation on a display includes tracking user motion of an input tool for a display (step 1505), comparing a motion of the input tool to a threshold (step 1510), and constraining the position of the visible portion of the page of information on the display if the user motion does not exceed the threshold (step 1515). The input tool may be a stylus 1200 or finger used on a display window 1205 with a touchscreen. The touchscreen may include, for example, a resistive sensor, a capacitive sensor, an acoustic wave sensor, or an infrared sensor.

The method 1500 may include separating the user motion of the input tool into a horizontal component and a vertical component. The horizontal component may be compared to the threshold to constrain horizontal motion of the page 1210 in the display window 1205 if the horizontal component does not exceed the threshold. Vertical motion may be left unconstrained, or may be compared to the same or a different threshold. In other implementations, only vertical motion may be constrained.

Figure 16:
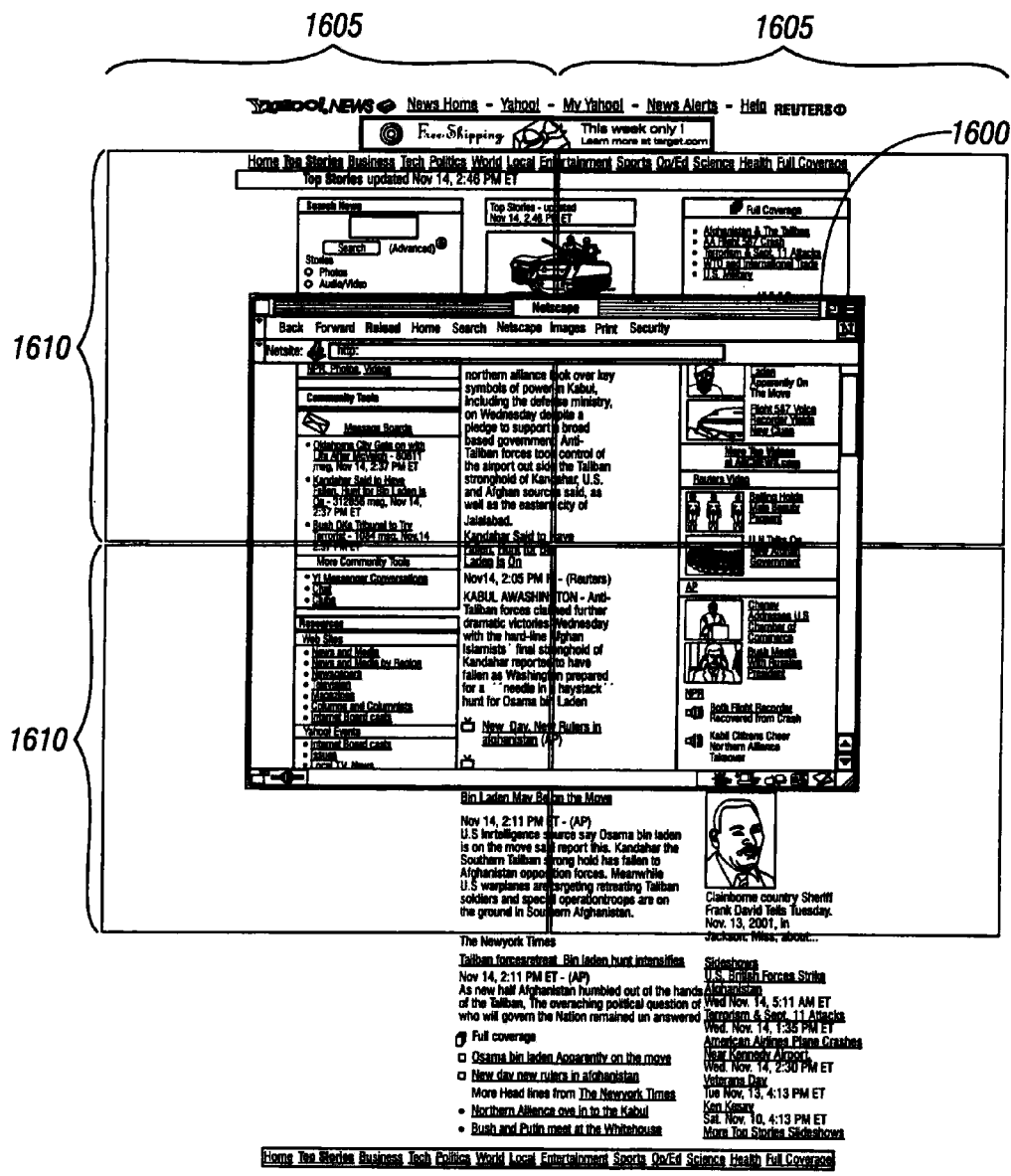
FIG. 16 illustrates a display window superimposed onto a page.

Referring to FIG. 16, touch-and-drag scrolling of a display window 1600 may be limited to the width and length of the display window. For example, as the user scrolls from left to right across the entire width 1605 of the display 1600, the document slides across the screen a distance that is equal to the width 1605 of the display 1600. Thus, movement up, down, left, or right is limited to a distance that is equal to the length 1610 or width 1605 of the display 1600. The user must then lift the pen or stylus from the screen and repeat the scrolling operation.

Typical desktop computers can associate movement of the operating system cursor with movement of the pointing device. In these systems, the cursor is both a software variable to detect user intentions and a graphic representation to provide the user with the location of the cursor. On a PDA, however, the cursor is not displayed on the screen because the tip of the pen already defines the location of the cursor. This location is forwarded to the application software by the operating system.

The operating system uses drivers that convert the movement or the position of the pointing device, which may be expressed in centimeters, to the movement of the cursor, which may be expressed in pixels. PDAs usually follow a paradigm inherited from the desktop computer, in that movement between the cursor is equivalent to movement of the document. Thus, the page scrolls an amount equal to the distance of the pen movement. For example, when the cursor moves 10 pixels, the document scrolls 10 pixels.

On a PDA or other device with a small display, scrolling the width or length of the display area provides viewing of only a small amount of document data. The user often must repeat the scrolling operation until the desired text comes into view.

A scrolling multiplier allows the user to specify movement of the document on the display as a multiplier or percentage of the physical movement of the stylus on the display. For example, referring to FIG. 17A, when the proportional movement is set to 200%, document scrolling 1700 on a display 1705 is 20 pixels for each 10 pixels of stylus or other input movement 1710. When the proportional movement is set to 50%, the document scrolling is 5 pixels for each 10 pixels of stylus or other input movement on the display. Referring to FIG. 17B, when the proportional movement is set to 300%, the document scrolling 1715 is 30 pixels for each 10 pixels of stylus or other input movement 1720 on the display 1725.

Figure 17A:
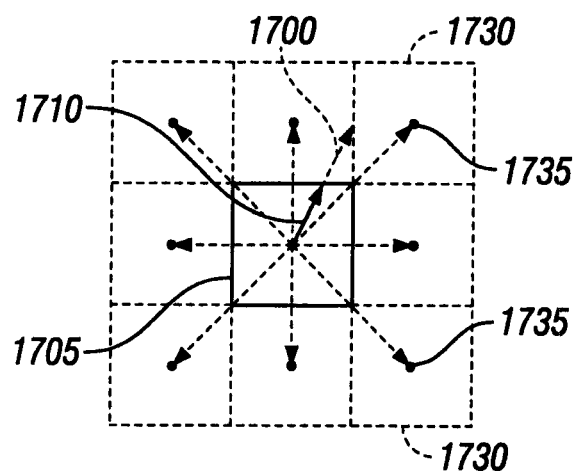
FIGS. 17A and 17B each illustrate a display window and a stylus.
Figure 17B:
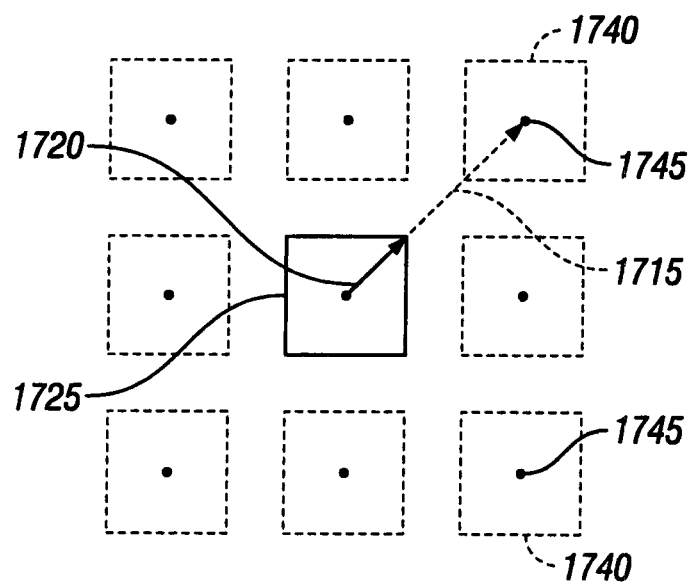

As shown in FIG. 17A, when the proportional movement is set to 200% and a new display 1730 is centered around the endpoint 1735 of the maximum potential document scrolling, the user has the capability to scroll a document area that is nine times the area of the display window 1705. Similarly, as shown in FIG. 17B, when the proportional movement is set to 300% and a new display 1740 is centered around the endpoint 1745 of the maximum potential document scrolling, the user has the capability to scroll a document area that is 16 times the area of the display window 1725. By contrast, when proportional movement is set to 100%, the user is able to scroll a document area that is four times the area of the display window. Thus, increasing proportional movement provides the user with the capability to scroll through several pages of the document with a single point-and-drag action.

Alternatively, the user can make very fine position adjustments by setting a multiplier that is less than one.

An additional benefit is the enhancement in the perceived responsiveness and scroll speed capability of the application software. Since with the same action there is additional scrolling, the scrolling action appears to occur at a higher velocity. Stated more simply, the motion of the document is perceived to be zippy instead of sluggish. In another implementation, the user may set the multiplier based on the speed or acceleration of the pointing device. For example, a higher stylus velocity translates into a higher multiplier to generate the appropriate number of pixels to move the cursor. In yet another implementation, different multipliers may be used for horizontal and vertical movement.

Figure 18:
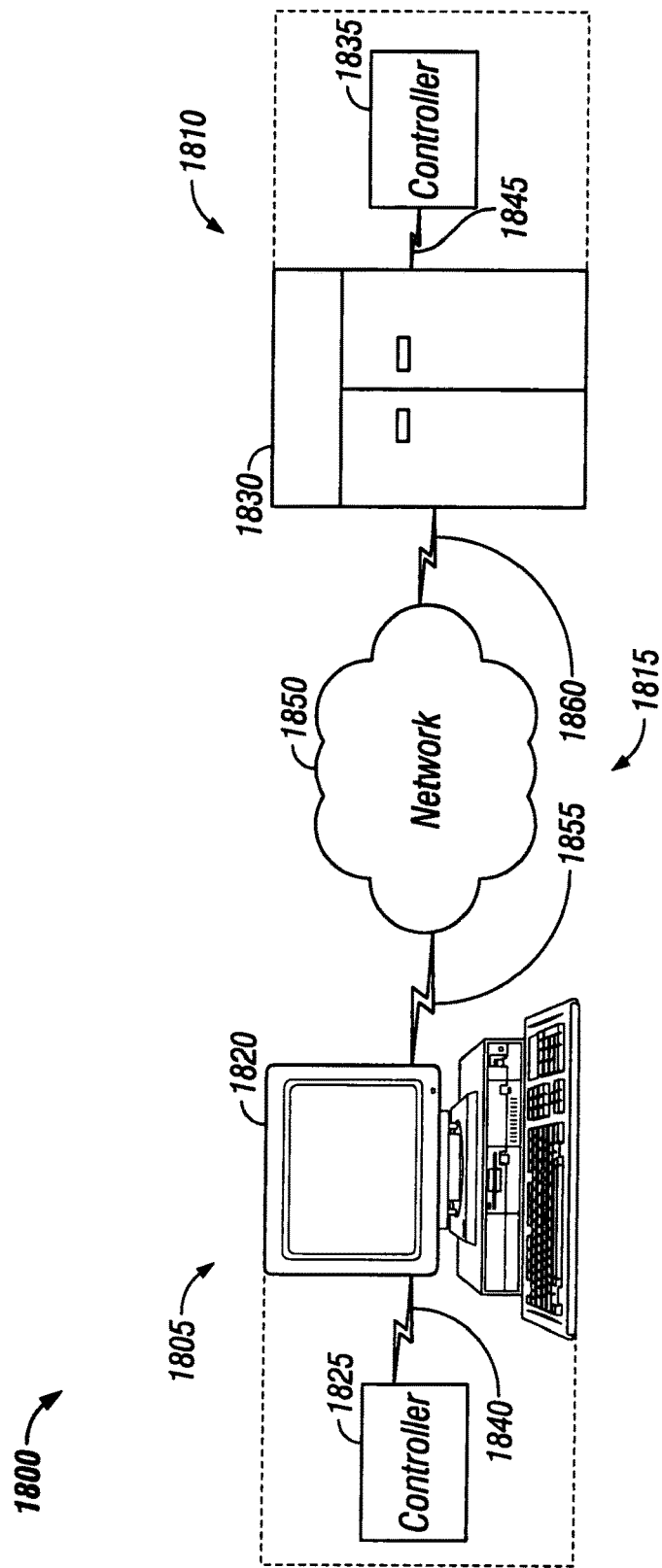
FIG. 18 is a block diagram of a computer and communications system.

For illustrative purposes, FIG. 18 describes a communications system for implementing a navigation aid to display information on an electronic device having limited display capability. For brevity, several elements in FIG. 18 are represented as monolithic entities. However, as would be understood by one skilled in the art, these elements each may include numerous interconnected computers and components designed to perform a set of specified operations and/or dedicated to a particular geographical region.

Referring to FIG. 18, a communications system 1800 is capable of delivering and exchanging data between a client system 1805 and a host system 1810 through a communications link 1815. The client system 1805 typically includes one or more client devices 1820 and/or client controllers 1825, and the host system 1810 typically includes one or more host devices 1830 and/or host controllers 1835. For example, the client system 1805 or the host system 1810 may include one or more general-purpose computers (e.g., personal computers), one or more special-purpose computers (e.g., devices specifically programmed to communicate with each other and/or the client system 1805 or the host system 1810), or a combination of one or more general-purpose computers and one or more special-purpose computers. The client system 1805 and the host system 1810 may be arranged to operate within or in concert with one or more other systems, such as, for example, one or more LANs ("Local Area Networks") and/or one or more WANs ("Wide Area Networks").

The client device 1820 (or the host device 1830) is generally capable of executing instructions under the command of a client controller 1825 (or a host controller 1835) and is capable of processing instructions or queries from the host system 1810. For example, the host system 1810 may query the client system 1805 as to the display size of the PDA device. The query may occur when the client 1805 and the host 1810 are connected or at periodic time intervals. The client device 1820 (or the host device 1830) is connected to the client controller 1825 (or the host controller 1835) by a wired or wireless data pathway 1840 or 1845 capable of delivering data.

Each of the client device 1820, the client controller 1825, the host device 1830, and the host controller 1835 typically includes one or more hardware components and/or software components. An example of a client device 1820 or a host device 1830 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. Often, the client device 1820 is implemented as a PDA or a mobile telephone.

An example of client controller 1825 or a host controller 1835 is a software application loaded on the client device 1820 or the host device 1830 for commanding and directing communications enabled by the client device 1820 or the host device 1830. Other examples include a program, a piece of code, an instruction, a device, a computer, a computer system, or a combination thereof, for independently or collectively instructing the client device 1820 or the host device 1830 to interact and operate as described. The client controller 1825 and the host controller 1835 may be embodied permanently or temporarily in any type of machine, component, physical or virtual equipment, storage medium, or propagated signal capable of providing instructions to the client device 1820 or the host device 1830.

The communications link 1815 typically includes a delivery network 1850 making a direct or indirect communication between the client system 1805 and the host system 1810, irrespective of physical separation. Examples of a delivery network 1850 include the Internet, the World Wide Web, WANs, LANs, analog or digital wired and wireless telephone networks (e.g., PSTN, ISDN, and xDSL), radio, television, cable, satellite, and/or any other delivery mechanism for carrying data. The communications link 1850 may include communication pathways 1855, 1860 that enable communications through the one or more delivery networks 1850 described above. Each of the communication pathways 1855, 1860 may include, for example, a wired, wireless, cable or satellite communication pathway.

The described processes and techniques may be performed by a browser running on the client system 1805 (e.g., a PDA). The processes and techniques also may be performed at a host or other remote device (e.g., a server) through which a web page is passed or from which a web page is received. The processes and techniques may be applied both to large displays and to small displays, to display windows that occupy varying portions of a display, and to full screen displays.

A number of implementations have been described. Nevertheless, it will be understood that various modifications may be made. Accordingly, other implementations are within the scope of the following claims.

What is claimed is:

1. A method comprising:
providing, on a display of a mobile device, a viewing area at a first position within content, wherein the content comprises a first portion and a second portion, wherein the content is larger than the viewing area, and wherein at the first position the viewing area displays at least a portion of the first portion of content;
detecting, using at least one processor, a touch input relative to the content;
in response to and during the touch input, shifting the content relative to the viewing area away from the first position and towards a second position within the content;
upon completion of the touch input, determining whether the detected touch input satisfies a predetermined threshold;
shifting, in response to a determination that the detected touch input satisfies the predetermined threshold, the content relative to the viewing area to the second position within the content, wherein at the second position the viewing area displays at least a portion of the second portion of content;
returning, in response to a determination that the detected touch input does not satisfy the predetermined threshold, the content to the first position within the viewing area;
detecting a horizontal component of the touch input and a vertical component of the touch input;
wherein shifting the content relative to the viewing area to the second position comprises shifting the content in a horizontal direction; and
wherein determining whether the detected touch input satisfies the predetermined threshold comprises determining whether the horizontal component of the touch input satisfies a horizontal threshold.

2. The method of claim 1, wherein the horizontal threshold comprises a boundary of the display of the mobile device.

3. The method as recited in claim 1, wherein the horizontal threshold comprises a number of pixels in the horizontal direction.

4. The method as recited in claim 1, further comprising constraining the shifting of the content to a single dimension.

5. The method as recited in claim 1, wherein the touch input comprises a touch and drag motion.

6. The method as recited in claim 1, wherein the predetermined threshold comprises a user-defined threshold.

7. The method as recited in claim 1, further comprising animating the shifting of the content to provide a sense of motion of the viewing area.

8. The method as recited in claim 1, wherein shifting, in response to the determination that the detected touch input satisfies the predetermined threshold, the content relative to the viewing area to the second position comprises centering the second portion of content within the viewing area.

9. A method comprising:
providing, on a display of a mobile device, a viewing area at a first position within content, wherein the content comprises a first portion and a second portion, wherein the content is larger than the viewing area, and wherein at the first position the viewing area displays at least a portion of the first portion of content;
detecting, using at least one processor, a touch input relative to the content;
in response to and during the touch input, shifting the content relative to the viewing area away from the first position and towards a second position within the content;
upon completion of the touch input, determining whether the detected touch input satisfies a predetermined threshold;
shifting, in response to a determination that the detected touch input satisfies the predetermined threshold, the content relative to the viewing area to the second position within the content, wherein at the second position the viewing area displays at least a portion of the second portion of content;
returning, in response to a determination that the detected touch input does not satisfy the predetermined threshold, the content to the first position within the viewing area;
detecting a horizontal component of the touch input and a vertical component of the touch input;
wherein shifting the content relative to the viewing area to the second position comprises shifting the content in a vertical direction; and
wherein determining whether the detected touch input satisfies the predetermined threshold comprises determining whether the vertical component of the touch input satisfies a vertical threshold.

10. The method of claim 9, wherein the vertical threshold comprises a boundary of the display of the mobile device.

11. The method as recited in claim 9, wherein the vertical threshold comprises a number of pixels in the vertical direction.

12. The method as recited in claim 9, further comprising constraining the shifting of the content to a single dimension.

13. The method as recited in claim 9, wherein the touch input comprises a touch and drag motion.

14. The method as recited in claim 9, wherein the predetermined threshold comprises a user-defined threshold.

15. The method as recited in claim 9, further comprising animating the shifting of the content to provide a sense of motion of the viewing area.

16. The method as recited in claim 9, wherein shifting, in response to the determination that the detected touch input satisfies the predetermined threshold, the content relative to the viewing area to the second position comprises centering the second portion of content within the viewing area.

17. A device comprising:
at least one processor; and
at least one non-transitory computer readable storage medium storing instructions that, when executed by the at least one processor, cause the device to:
provide, on a display, a viewing area at a first position within content, wherein the content comprises a first portion and a second portion, wherein the content is larger than the viewing area, and wherein at the first position the viewing area displays at least a portion of the first portion of content;
detect a touch input relative to the content;
in response to and during the touch input, shift the content relative to the viewing area away from the first position and towards a second position within the content;
upon completion of the touch input, determine whether the detected touch input satisfies a predetermined threshold;

shift, in response to a determination that the detected touch input satisfies the predetermined threshold, the content relative to the viewing area to the second position within the content, wherein at the second position the viewing area displays at least a portion of the second portion of content;

return, in response to a determination that the detected touch input does not satisfy the predetermined threshold, the content to the first position within the viewing area;

detect a horizontal component of the touch input and a vertical component of the touch input;

wherein shifting the content relative to the viewing area to the second position comprises shifting the content in a horizontal direction; and wherein determining whether the detected touch input satisfies the predetermined threshold comprises determining whether the horizontal component of the touch input satisfies a horizontal threshold.

18. The device as recited in claim 17, wherein the horizontal threshold comprises a number of pixels in the horizontal direction.

19. The device as recited in claim 17, wherein the horizontal threshold comprises a boundary of the display.

20. The device as recited in claim 17, further comprising constraining the shifting of the content to a single dimension.

* * * * *